United States Patent [19]

Hidaki

[11] Patent Number: 4,624,841
[45] Date of Patent: Nov. 25, 1986

[54] PROCESS FOR REFINING AN AMMONIA SYNTHESIS GAS

[75] Inventor: Morihisa Hidaki, Chiba, Japan

[73] Assignee: Toyo Engineering Corporation, Tokyo, Japan

[21] Appl. No.: 693,491

[22] Filed: Jan. 22, 1985

[30] Foreign Application Priority Data

Jan. 23, 1984 [JP] Japan .................................. 59-9697
Mar. 8, 1984 [JP] Japan .................................. 59-44290
Oct. 30, 1984 [JP] Japan .................................. 59-228721

[51] Int. Cl.$^4$ .............................................. C01C 1/04
[52] U.S. Cl. ....................................... 423/359; 55/25; 55/33; 55/68; 55/70; 252/377
[58] Field of Search ....................... 423/359; 55/68, 25, 55/33, 70; 252/377

[56] References Cited

U.S. PATENT DOCUMENTS

| 3,442,613 | 5/1969 | Grotz | 423/354 |
| 4,296,085 | 10/1981 | Banquy | 252/373 |
| 4,409,196 | 10/1983 | Skinner et al. | 423/359 |
| 4,512,780 | 4/1985 | Fuderer | 55/68 |

Primary Examiner—John Doll
Assistant Examiner—Wayne A. Langel
Attorney, Agent, or Firm—Flynn, Thiel, Boutell & Tanis

[57] ABSTRACT

The synthesis gas for an ammonia synthesis process is refined by treating same in an adsorption-desorption unit to remove nitrogen either during the carbon oxide removal step or in the ammonia synthesis loop.

29 Claims, 11 Drawing Figures

PROCESS FOR REFINING AN AMMONIA SYNTHESIS GAS

This invention relates to improvements in a process for producing a feed gas for the synthesis of ammonia.

The most conventional ammonia synthesis processes are generally composed of the following steps:

(a) Primary steam reforming reaction step;

$$CH_4 + H_2O \rightarrow CO + 3H_2$$

(b) Secondary steam reforming reaction step;

$$CH_4 + H_2O \rightarrow CO + 3H_2$$

$$CH_4 + O \rightarrow CO + 2H_2$$

(c) Carbon monoxide shift conversion reaction step;

$$CO + H_2O \rightarrow CO_2 + H_2$$

(d) Carbon oxides removal step;
(e) Ammonia synthesis reaction step; and $$N_2 + 3H_2 \rightarrow 2NH_3$$

(f) Synthesis gas recirculation

The above reaction step (a) proceeds incompletely under the conditions of steam-to-carbon ratio, temperature, and pressure that are selected from the economic point of view. A small amount of the thus-remaining, unreacted methane is almost completely converted to carbon monoxide and hydrogen in the reaction step (b). More particularly, in the reaction step (b), air is mixed with the high temperature gas from the reaction step (a) to burn a portion of the methane, thereby raising the temperature to a higher temperature at which the unreacted methane is reduced in amount to a lower level, in the presence of a catalyst.

Carbon monoxide in the gas produced in the foregoing steam reforming reaction steps is then nearly completely converted to carbon dioxide and hydrogen is generated in the carbon monoxide shift conversion reaction step (c). The thus-converted gas is treated in the carbon oxides removal step (d) sequentially to remove carbon dioxide and carbon monoxide and is then fed to the ammonia synthesis reaction step (e) wherein ammonia is synthesized.

In the conditions for the reaction step (b), the amount of air that supplies the oxygen used in the reaction step (b) is generally so determined that the air provides nitrogen in the stoichiometric amount required in the reaction step (e). As a result, the amount of air used in the reaction step (b) is restricted in order to comply with this requirement. The reactions in the steps (a) and (b) are reactions for converting methane to carbon monoxide and hydrogen. If it is possible to use a larger amount of air in the reaction step (b), the reaction in the step (b) will be effected to a greater extent, thereby reducing considerably the "duty" of the reaction step (a). The term "duty" means the extent of the reaction that must be achieved in the reaction step (a), that is, the proportion of $CH_4$ reacted in step (a) to the total amount of $CH_4$ reacted in steps (a) and (b).

The reformer in which the reaction of step (a) is carried out is generally of the externally heated type and the tubes in the reformer are exposed to high temperature and pressure conditions which are extremely severe from the standpoint of their effects on the material of which the tubes are made. In such a situation, a reduction of the duty in the reaction step (a) means that the tube material of the primary reformer will not need to be operated under such severe conditions. Conversely, it will become possible to reform the gas under a higher pressure in the primary reformer.

In this way, the compression power required for the synthesis of ammonia will be reduced to a considerable extent. Further, the secondary reformer is of the internally heated type which is extremely high in thermal efficiency. In contrast, the primary reformer is of the externally heated type and is rather low in thermal efficiency. Accordingly, the overall thermal efficiency of the reformers will be increased by introducing a larger amount of air into the secondary reformer and thereby reducing the "duty" of the primary reformer. Therefore, this process is very attractive. To render this process effective, however, the excess nitrogen that is fed into the secondary reformer must be removed somewhere during the course of the entire ammonia synthesis process.

As a method of doing this, there has been disclosed a process for removing the excess nitrogen from the synthesis gas by means of the low temperature separation method prior to subjecting the gas to the ammonia synthesis reaction step (e), that is, excess nitrogen is removed between step (d) and step (e). In this process, the synthesis gas is allowed to expand adiabatically, using an expander, to generate a low temperature condition under which nitrogen in the synthesis gas is liquefied and is separated to such an extent that the hydrogen-to-nitrogen ratio in the resulting synthesis gas is adjusted to be the ratio suitable for the ammonia synthesis reaction step (e). At the same time, methane in the synthesis gas is removed nearly completely, and carbon monoxide and argon are removed to a certain degree.

Further, there has been proposed another process in which the ammonia synthesis gas containing excess nitrogen is treated with the low temperature separation method in the ammonia synthesis loop (Japanese Patent Laid-Open No. 60298/1979).

The former nitrogen-removal process is an excellent one, but the previous separation of carbon monoxide in step (d) is generally so incomplete that the synthesis gas has to undergo a methanation reaction step and a water adsorption-removal step prior to being introduced into the low temperature separation unit. Therefore, this process is not fully satisfactory in view of the complicated process sequence, the costs of the apparatus and the operational expenses.

The latter nitrogen-removal process effects the same treatment, but this is carried out in the ammonia synthesis loop. In order to carry out the low temperature separation in the ammonia synthesis loop, it is necessary first to remove ammonia completely from the synthesis gas. Moreover, the concentration of nitrogen to be treated in the low temperature separation method is low as compared with that in the former process, and this low concentration is disadvantageous with regard to effecting liquefaction of nitrogen. Accordingly, taking these factors into account, the latter process is not fully satisfactory as an economical process for removing the excess nitrogen.

SUMMARY OF THE INVENTION

Figure 1:
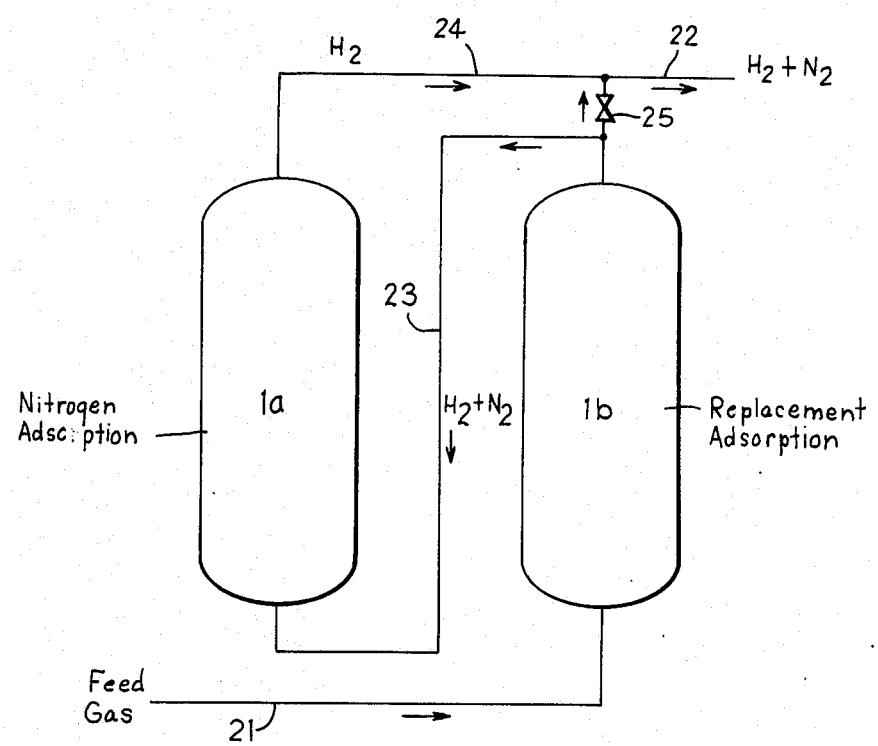
FIG. 1 is a schematic diagram illustrating the principle of the adsorption steps employed in the first and third embodiments of the present invention.

The present invention provides a process for treating an ammonia synthesis gas that contains excess nitrogen, using an adsorption-desorption unit.

There are three embodiments of the present invention, as follows: (i) the synthesis gas is treated in an adsorption-desorption unit during step (d), that is, prior to entering the ammonia synthesis loop, with or without previous carbon dioxide removal; (ii) the synthesis gas is treated in an adsorption-desorption unit during the step (e), that is, within the ammonia synthesis loop, with previous ammonia removal; and (iii) the synthesis gas is treated in an adsorption-desorption unit also within the ammonia synthesis loop, with or without previous ammonia removal, and with previous carbon dioxide removal. Since the first and third embodiments are substantially identical to each other in principle, these two embodiments will first be described hereunder.

In conventional ammonia synthesis processes, the greater part of the carbon monoxide in the gas produced in the reforming reaction steps is converted to carbon dioxide and hydrogen is generated in the subsequent carbon monoxide shift conversion reaction step (c). The gas is then introduced into the ammonia synthesis reaction step (e) after being treated in the carbon oxides removal step (d).

When carbon dioxide is required for producing urea, it is necessary to remove carbon dioxide separately from carbon monoxide during the step (d). However, when carbon dioxide is not required for the production of urea, carbon dioxide and carbon monoxide can be removed simultaneously in the practice of the process of the first embodiment.

When carbon dioxide is separately removed in an isolated unit, the concentration of carbon dioxide in the gas is generally reduced to less than 0.1 vol. %.

In the third embodiment, however, it is necessary to remove carbon dioxide as completely as possible. Since the unremoved carbon dioxide is eventually admixed into the product ammonia, it is essential to reduce it to a concentration of less than 50 ppm, preferably to less than 10 ppm, in the product ammonia.

The gas from which carbon dioxide has been removed then undergoes subsequent carbon oxide removal. The carbon oxide removal process widely used at present is the methanation process wherein carbon oxide and hydrogen react with each other to produce methane.

Although methane is non-poisonous to an ammonia synthesis catalyst, it accumulates in the gas that is circulating through the ammonia synthesis loop. Therefore, methane must be purged from the system so that its concentration in the circulating gas does not exceed a certain limit. This purging eventually leads to loss of some of the synthesis gas.

Moreover, in the methanation reaction, carbon monoxide consumes hydrogen in a molar amount three times as much as the molar amount of the carbon monoxide, and carbon dioxide consumes hydrogen in a molar amount four times that of the carbon dioxide. Hence, the loss of the thus-consumed hydrogen is significant and cannot be ignored.

Carbon dioxide and carbon monoxide in the synthesis gas can be removed simultaneously in accordance with the process of the first and third embodiments of the present invention.

The pressure swing adsorption-desorption unit employed in the process of the present invention functions as follows:

i. Removal of water.
 ii. Removal of ammonia.
 iii. Removal of carbon dioxide.
 iv. Removal of carbon monoxide.
 v. Removal of excess nitrogen.
 vi. Removal of methane and argon.

When the gas to be treated is passed through an ordinary adsorption-desorption unit, there are adsorbed not only water, ammonia, carbon dioxide, carbon monoxide, etc. which are relatively strongly adsorbed, but also nearly all of the nitrogen, methane and argon contained in the gas, thereby allowing pure hydrogen to flow out of the unit. As the adsorption proceeds further, the adsorbent bed ultimately reaches saturation. When this occurs, the adsorbent bed is saturated with a large amount of nitrogen as well as adsorbable components other than nitrogen, because nitrogen is present in the largest amount among the adsorbable components in the gas.

If the gas is permitted to continue to flow in after saturation has occurred, the adsorbable components other than nitrogen are adsorbed in place of the nitrogen which has previously been adsorbed, and the previously adsorbed nitrogen thus-replaced or desorbed is discharged from the unit. In other words, the hydrogen and nitrogen in the incoming feed gas are not adsorbed, but rather, the replaced nitrogen is merged with the unadsorbed hydrogen and nitrogen and flows out of the unit after saturation has occurred.

In this case, water, ammonia, carbon dioxide and carbon monoxide are almost completely adsorbed, because these gaseous components are more adsorbable than nitrogen and because the nitrogen to be replaced is present on the adsorbent in a large amount.

Methane is a little more adsorbable than nitrogen and argon is about as adsorbable as nitrogen. However, since there exists a large amount of the nitrogen to be replaced, the majority of the methane and also a considerable portion of the argon in the feed gas are adsorbed onto the adsorbent.

However, when a conventional adsorption-desorption system is employed, the content of nitrogen gas in the discharged gas from the unit fluctuates widely. Therefore, the discharged gas, as it is, cannot be fed into an ammonia synthesis unit. Accordingly, it is necessary to suppress this fluctuation.

The inventor has solved this problem by the means described below, the principle of which is also illustrated in FIG. 1.

In FIG. 1, a gaseous mixture of hydrogen and nitrogen flows through a branch line 23 from adsorption bed 1b and thence through an adsorption bed 1a wherein nitrogen in said gaseous mixture is adsorbed (hereinafter referred to as the "nitrogen-adsorption step").

The adsorbent bed 1b has previously been saturated with nitrogen. The water, ammonia, carbon dioxide, carbon monoxide, methane, and argon in the feed gas fed through the conduit 21 are adsorbed and removed from the feed gas and they replace the previously adsorbed nitrogen in the bed 1b (hereafter called the "replacement-adsorption step").

More particularly, the feed gas is introduced from line 21 first to the adsorbent bed 1b herein adsorbable components other than nitrogen are adsorbed and separated from the gas. A portion of the gas discharged from the adsorbent bed 1b is fed through line 23 to the adsorbent bed 1a and the remainder of the gas is directly flowed out of the unit through valve 25 into line 22.

Nitrogen in the gaseous stream fed into the adsorbent bed 1a is removed almost completely within said bed so that the gas discharged from said bed is substantially pure hydrogen, which latter is flowed through line 24 and is mixed in line 22 with the remainder of the gaseous stream that has been discharged out of the adsorbent bed 1b.

By regulating, by means of valve 25, the ratio of the flow rates of (1) the stream that is flowed out of the bed 1b directly into line 22 to (2) the flow rate of the stream that is discharged from the adsorbent bed 1a, the hydrogen-to-nitrogen ratio in the resulting gaseous mixture of both streams can be so adjusted as to be best suited to the subsequent ammonia synthesis reaction. In other words, when it is desired to remove a larger amount of nitrogen from the feed gas, the amount of the stream that is flowed through the adsorbent bed 1a is increased, whereas when a smaller amount of nitrogen is required to be separated, the amount of the stream that flows through the adsorbent bed 1a is decreased.

Thus, in the process of the present invention, the adsorption is carried out in the two steps of (a) replacement-adsorption and (b) nitrogen-adsorption. However, saturation of the adsorbent beds takes place earlier in the bed 1a that is undergoing the nitrogen-adsorption step than in the bed 1b that is undergoing the replacement-adsorption step, when nitrogen is present in the feed gas in a properly excess amount for use as an ammonia synthesis gas and the adsorbable components that are to replace nitrogen in the replacement-adsorption step are present in an amount corresponding to the amount of the excess nitrogen. Accordingly, the duration of each step of the cycle of operation of the adsorbent beds is determined on the basis of the time required to effect saturation of the adsorbent bed that is undergoing the nitrogen-adsorption step.

In FIG. 1, when the bed 1a that is undergoing the nitrogen-adsorption step becomes saturated and nitrogen begins to leak through, the stream of the incoming feed gas in the conduit 21 is switched over to flow directly into the bed 1a; that is, the bed 1a is switched so that it undergoes the replacement-adsorption step, while the bed 1b is simultaneously subjected to a desorption step. A portion of the gas that flows out of the bed 1a is simultaneously flowed into a succeeding adsorbent bed wherein it is subjected to a nitrogen-adsorption step. Additional details concerning this will be set forth in the following description concerning FIG. 2.

When the bed undergoing the nitrogen-adsorption step becomes saturated with nitrogen, the bed undergoing the replacement-adsorption step has not yet been saturated with other adsorbable components. In this regard, the term "saturation" as applied to the bed undergoing replacement-adsorption signifies the state in which nitrogen adsorbed on the adsorbent bed is replaced by adsorbable components other than nitrogen to the greatest possible extent. Although it is dependent on the amount of ammonia or carbon dioxide in the feed gas, saturation is achieved (a) to a depth of 15–25% measured from the inlet of the adsorbent bed, based on the total depth of the bed, when carbon dioxide is removed in advance and ammonia is not contained in the gas, and (b) to a depth of 50–80% from the inlet of the adsorbent bed when carbon dioxide or ammonia is contained in the gas, as shown in the example below.

It should be noticed that when this adsorbent bed is subjected to desorption, there is no portion of the bed that remains unadsorbed in the vicinity of the outlet of the adsorbent bed as sometimes occurs in a conventional desorption step. This fact also indicates that the loss of hydrogen takes place substantially due to the presence of gas in the voids of the adsorbent bed.

It is being demanded that the energy requirements for ammonia plants be reduced further in view of the need to conserve energy. The most important requirement in incorporating a pressure swing adsorption-desorption unit into an ammonia plant lies in how best to improve the rate of hydrogen recovery. In this sense, conventional pressure swing adsorption-desorption units are quite unsatisfactory and the unit disclosed hereinafter will meet the foregoing requirement in a more satisfactory manner.

In order to improve the rate of hydrogen recovery, it is most important to recover hydrogen in the gas present in the voids of the adsorbent.

For this purpose, the following procedure A is effective:

A-i. Before undergoing depressurization, one adsorbent bed which has undergone the replacement-adsorbent step is swept with a replacing gas that contains almost no hydrogen and the thus-expelled void space gas is discharged from said absorbent bed and is recirculated as a feed gas. Alternatively, the thus-expelled gas is allowed to flow into another adsorbent bed undergoing the repressurization step.

A-ii. The gas evolved in the subsequent depressurization-desorption step is drawn and pressurized to a pressure higher than the adsorption pressure in order to prepare the replacing gas described in the foregoing step A-i. The thus-pressurized gas is stored in a vessel to be used as the replacing gas.

Alternatively, the following procedure B is also effective:

B-i. As soon as one adsorption bed which has undergone the replacement-adsorption step is switched so as to begin undergoing the desorption step, said one bed is depressurized to a medium pressure and then is swept with a replacing gas that contains almost no hydrogen so that the gas present in the voids of said one bed is replaced. The gas evolved by said depressurization and the thus-expelled gas are discharged from said one bed and recirculated as a feed gas for the synthesis of ammonia. Alternatively, the gas evolved in said depressurization and the gas expelled by the replacement are allowed to flow into another adsorbent bed undergoing the repressurization step.

B-ii. The gas evolved in the further depressurization is drawn and pressurized to a pressure higher than the replacement pressure, in order to prepare the replacing gas described in the procedure B-i. The thus-pressurized gas is stored in a tank to be used as the replacing gas.

Further, the following procedure C is also effective:

C-i. As soon as one adsorption bed which has undergone the replacement-adsorption step is switched to begin undergoing the desorption step, said one bed is depressurized and the gas evolved by the depressurization is allowed to flow into an adsorbent bed undergoing the repressurization step.

C-ii. Said one bed is further depressurized and then is "replaced", throughout its entire depth, with a replacing gas that contains almost no hydrogen. The gas thus evolved and expelled is stored once in an intermediate tank to be used as a filling gas for the repressurization step. The replacing gas is prepared in the same manner as described in the foregoing step A-ii.

As described earlier, since the adsorbent bed is saturated with the strongly adsorbable components in the vicinity of the inlet thereof, it is advisable to carry out the replacement by feeding the replacing gas through the inlet thereof. The gas present in the voids of the adsorbent bed is thereby expelled to a greater extent. Since the thus-expelled gas has almost the same composition as the feed gas, it is advantageous to conduct it to the outside of the unit and recirculate it as a feed gas, or to allow it to flow into an adsorbent bed undergoing the repressurization step.

Thus, most of the gas present in the voids is driven off and the hydrogen contained in the gas is recovered. The first procedure A is superior in the recovery of hydrogen, but it is accompanied by the drawback that large expensive facilities are required for producing the replacing gas. It is the intention of the foregoing second and third procedures B and C to make the facilities for producing the replacing gas as low in cost as possible and to keep the rate of hydrogen recovery not lower than that obtained in the first procedure A. Specifically, the gas evolved during the depressurization and the gas expelled by the replacement at a medium pressure are recirculated as a feed gas for the synthesis of ammonia, or allowed to flow into an adsorbent bed undergoing the repressurization step, whereby the hydrogen in the evolved and expelled gases is recovered.

After completion of the depressurization and subsequent replacement, the replacing gas is prepared. More particularly, the gas evolved in the further depressurization is fed into an intermediate tank in an amount as required and is then pressurized so that it can be stored for use in the replacement. The greater part of the adsorbent bed is thus occupied with nitrogen and the gas previously present in the voids of the adsorbent bed has been expelled almost completely. As a result, the gas evolved in the early stage of said further depressurization is composed almost entirely of nitrogen and contains only a small amount of hydrogen and the strongly adsorbable components. Accordingly, it is effective to carry out the preparation of the replacing gas immediately after completion of the foregoing replacement. In this way, it is possible to eliminate the expense otherwise required for installing facilities for compression and for the energy for effecting compression of the gas in the preparation of the replacing gas, because the remaining pressure in the adsorbent bed after the replacement is still considerably high.

By the procedures as described above, the rate of hydrogen recovery is greatly improved and reaches as high as 98–99%.

In the process of the present invention, hydrogen or a hydrogen-containing gas is not substantially employed as an inert gas for use in the desorption step, in order to increase the rate of hydrogen recovery. Consequently, the desorption step must be carried out depending primarily on pressure relief (decrease).

Since nitrogen, methane, and argon are weak in adsorption affinity, desorption of these gases is not accompanied by serious difficulties. However, sufficiently effective measures should be employed to effect desorption of water, ammonia, carbon dioxide and carbon monoxide which are strong in the adsorption affinity. In some cases, it will become necessary to apply vacuum or heating in order to effectively desorb these strongly adsorbable gaseous components.

To carry out the desorption of the strongly adsorbable gaseous components, it is effective to depressurize down to a vacuum, or introduce a hot gas, or a combination thereof. The hot gas can advantageously be prepared in such a way that a gas consisting essentially of nitrogen evolved from an adsorbent bed undergoing the desorption step is collected and stored in a tank under heating so as to be used for desorbing the strongly adsorbable components adsorbed on the bed as required. In addition, it may be preferable to introduce this hot gas at the zone in the adsorbent bed which the adsorption front of the strongly adsorbable components reached at the end of the replacement-adsorption step.

It is also desirable to cool the adsorbent bed before it undergoes the repressurization step. To achieve this, it is useful to introduce a cold gas through the same nozzle as the one used for feeding the hot gas. For this purpose, it is recommended that a gas evolved during the depressurization is cooled in advance and stored in a tank, and the thus-cooled gas is then fed into the adsorbent bed after completion of the feeding of the hot gas, thereby cooling the adsorbent bed.

As a desorption procedure, there is a procedure wherein an adsorbent bed containing adsorbed components is heated by a circulating heating gas. Specifically, in this procedure, a circulating gas is heated by a heating source in a circulating loop, thereby preparing a circulating heat exchange gas, which is used for heating the adsorbent bed and expelling the adsorbable components adsorbed thereon in the desorption step. In this case, it is most efficient to apply vacuum jointly with heating by means of the hot exchange gas.

Although this procedure is preferred when a proper heat source is available, it has the drawback that the thus-heated adsorbent bed eventually needs to be cooled, thereby resulting in a longer duration in carrying out the cycle of steps of the adsorption-desorption unit.

Moreover, the aforementioned introduction of the hot gas is carried out on a relatively small scale because the amount of the gas is limited only to that present in the storing tank.

In a conventional pressure swing adsorption-desorption unit, the gas evolved in the early stage of the depressurization-desorption step is used as a filling gas for the repressurization step. This is because the thus-evolved gas is almost identical in composition to the product gas due to the fact that unused adsorbent still remains in the discharge end portion of the adsorbent bed. In the process according to the present invention, however, there remains no unused portion in the adsorbent bed as described above and, therefore, the gas evolved in the initial stage of the depressurization-desorption step is almost identical to the gas fed to the adsorbent bed. Thus, it is preferable to conduct the gas evolved in the early stage of the depressurization and the gas expelled by the replacement to the outside of the adsorption-desorption unit so that these gases can be recirculated as part of the fresh feed gas. Alternatively, the gas evolved during the depressurization and the gas expelled by the replacement-adsorption can also be used as a filling gas for an adsorbent bed undergoing the repressurization step.

It might be thought unusual to use a gas similar to the feed gas as a filling gas for the repressurization step. However, it will be understood that this will not cause any problem, if the repressurization step is considered as being the beginning of the adsorption step.

It is appropriate in this process to use the substantially pure hydrogen that flows out of the bed that is undergoing the nitrogen-adsorption step as the gas for filling the adsorbent bed that is undergoing the repressurization step. Use of this gas for filling the adsorbent bed undergoing the repressurization step has entirely no relation with the loss of hydrogen, because this gas is used internally within the system of the adsorption-desorption unit.

This repressurizing gas is obtained by forwarding through a branch pipe a portion of the gas that is flowing from an adsorbent bed undergoing the nitrogen-adsorption step. In this case, because it is not preferred to experience a large quantitative fluctuation in the flow of the stream of the repressurizing gas, a buffer or accumulator tank is desirably provided to suppress the fluctuation in the flow rate.

Figure 2:
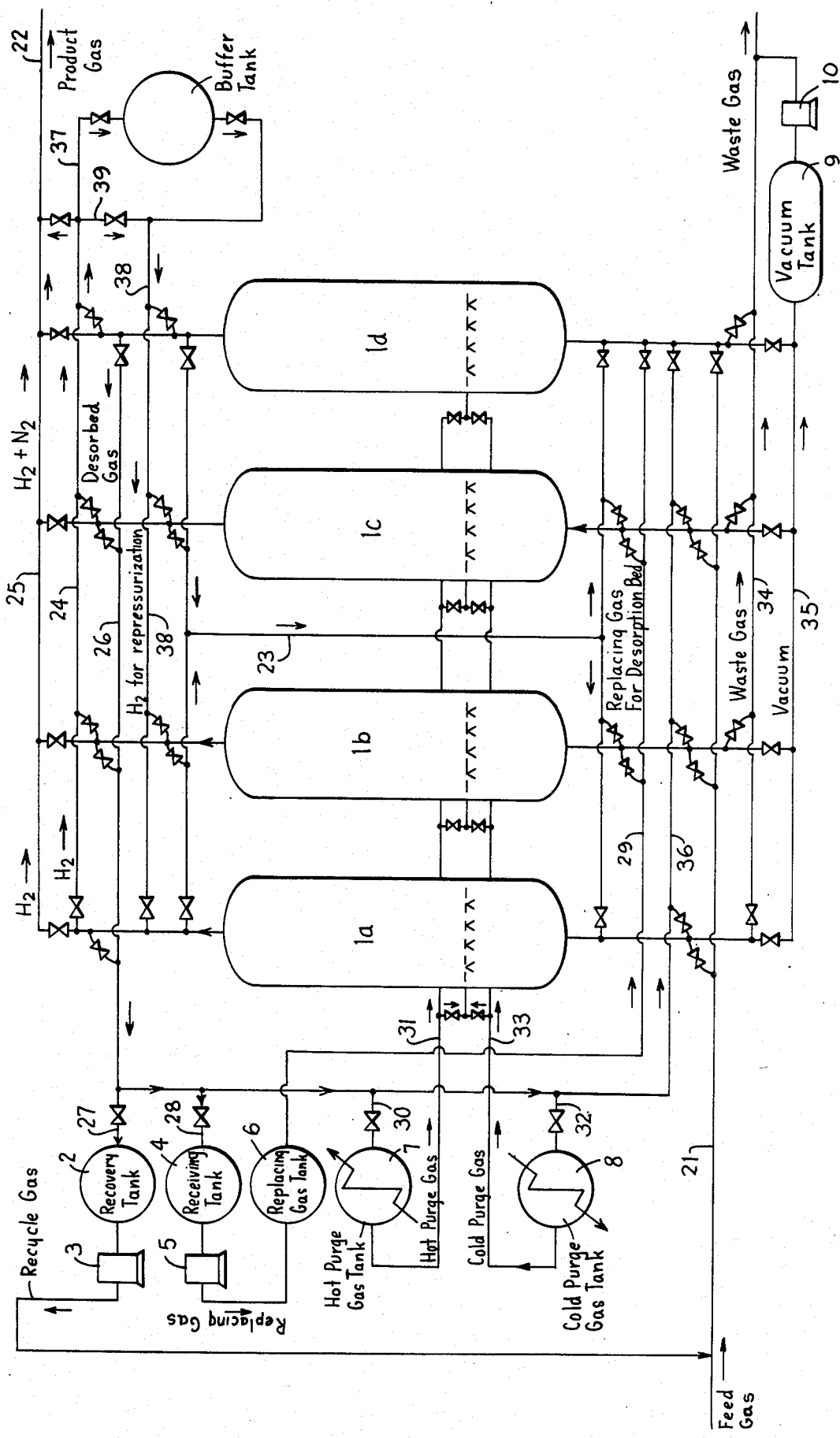
FIG. 2 is a schematic flow diagram of an adsorption-desorption unit for carrying out the process of the first embodiment of the present invention.

Referring to FIG. 2, while the adsorbent bed that is undergoing the repressurization step is not being filled, the filling gas obtained from the bed undergoing the nitrogen-adsorption step is fed into a buffer tank 11 at a constant flow rate. When effecting the filling of the adsorbent bed that is undergoing the repressurization step, the gas from the buffer tank 11 is first fed into the adsorbent bed that is undergoing the repressurization step through a filling line, while in the meantime the filling gas obtained from the bed undergoing the nitrogen-adsorption step is continuously fed to the buffer tank 11 through a hydrogen gas line. When the pressure in the adsorbent bed undergoing repressurization has become substantially equal to the pressure in the buffer tank 11, the inlet and outlet valves of the buffer tank 11 are closed and the bypass valve thereof is opened so that the filling gas can be fed directly into the adsorbent bed undergoing the repressurization step through the hydrogen gas line. In this fashion, the buffer tank 11 serves as a buffer volume when the filling operation is stopped and thereby ensures that a substantially constant volume of the filling gas will flow through the hydrogen gas line at all times. Additional details about the system of FIG. 2 will be given hereinafter.

Generally, adsorption can advantageously be carried out at a lower temperature, because the amount of adsorbable components that are adsorbed onto an adsorbent is increased as the temperature at which the adsorption is carried out is decreased.

Disclosed hereinbelow is a process wherein a feed gas from the aforementioned carbon monoxide shift conversion reaction step (c) undergoes carbon dioxide removal at a low temperature and the resulting gas is directly introduced into an adsorption-desorption unit at the lower temperature.

By the process that has been briefly summarized above, the operating pressure in the primary reforming reaction step can be increased and the amount of air fed into the secondary reforming reaction step can also be increased. This causes the concentration of carbon dioxide to increase in the resulting reformed gas. As a result, in many cases, the pressure and carbon dioxide concentration in the carbon dioxide removal step are increased in comparison with conventional carbon dioxide removal processes. It is well known that a physical absorption process can properly be used when the pressure of and the carbon dioxide concentration in the gas to be treated are high.

The physical absorption process includes a process in which carbon dioxide is absorbed at a low temperature using methanol as a solvent (commonly referred to as "Rectisol process").

In this process, carbon dioxide is removed from a carbon dioxide-containing gas by washing said gas with methanol at a low temperature (0° to −60° C). The leakage of carbon dioxide in the washed gas varies with the operating conditions, but the concentration of carbon dioxide in the washed gas is generally less than 0.1 vol. %. This order of leakage is quite acceptable in the process of the first embodiment of the invention, but, in the case of the third embodiment of the invention, the carbon dioxide concentration is desirably as low as less than 50 ppm, preferably less than 10 ppm, based on the product ammonia.

By using this carbon dioxide removal unit and the pressure swing adsorption-desorption unit according to the present invention in combination, the adsorption can be carried out at a low temperature, leading to a reduction of the amount of adsorbent that is required. A refrigeration unit may be needed in order to generate the desired low temperature, but the provision of refrigeration for this purpose can be made less costly because it can be combined with other refrigeration units used in the ammonia synthesis plant.

By means of this process, water in the feed gas is nearly completely eliminated and, instead, a methanol vapor is admixed therewith to a slight extent. However, since methanol is as strong as water in its adsorption affinity, it can be readily removed by adsorption.

In the process of the third embodiment of the invention, the desorbed gas discharged from the adsorption-desorption unit is a low pressure mixed gas containing approximately 50% of ammonia. As a means of recovering ammonia from this mixed gas, it is preferred that the gas is first washed with water to obtain an aqueous ammonia solution, the resulting aqueous ammonia solution is subjected to distillation to obtain gaseous ammonia, and the gaseous ammonia thus-obtained is cooled and liquefied so as to be recovered as liquid ammonia.

The resulting gas washed with water and from which ammonia has been removed consists mainly of nitrogen and it has a small caloric value. Therefore, when it is to be used as a fuel, it is desirable to mix it with other fuel gas prior to effecting combustion.

Figure 9:
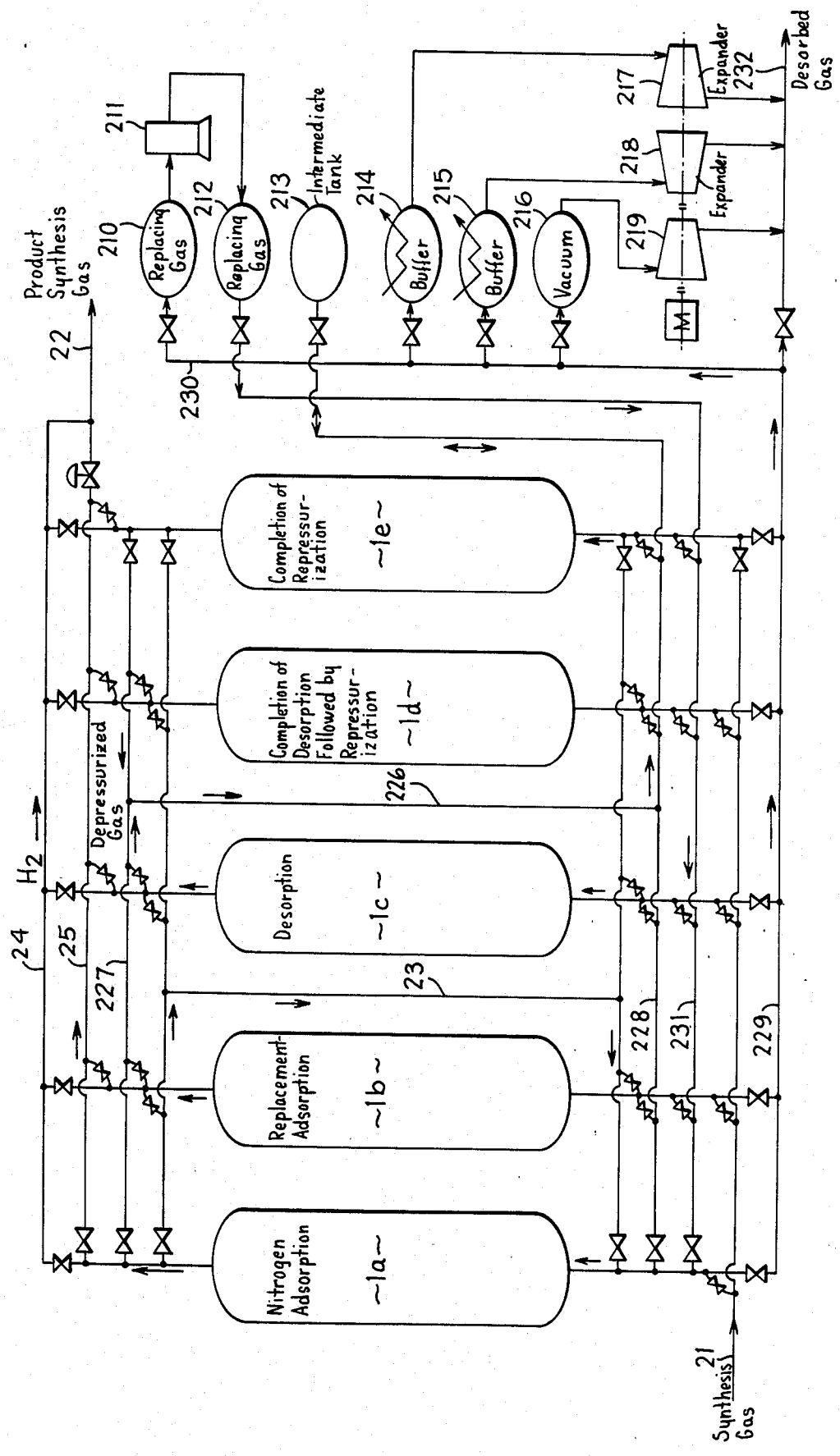
FIG. 9 is a schematic diagram of an adsorption-desorption unit comprising five adsorbent beds for carrying out a process according to the third embodiment of the preseht invention.

The waste gas will be at above atmospheric pressure and the sequential system of depressurization shown in the "Desorption Step" of FIG. 9 will be effective. More particularly, the desorption down to vacuum can be effected by using the energy generated during the depressurization by means of an expander, whereby the pressure of the gas evolved under vacuum is increased so as to be used as the fuel gas described above. The increased pressure of the desorbed gas is also favorable for the absorption of ammonia with water.

Additional details of the first embodiment of the invention will be given with reference to the following example of a practical design.

Figure 3:
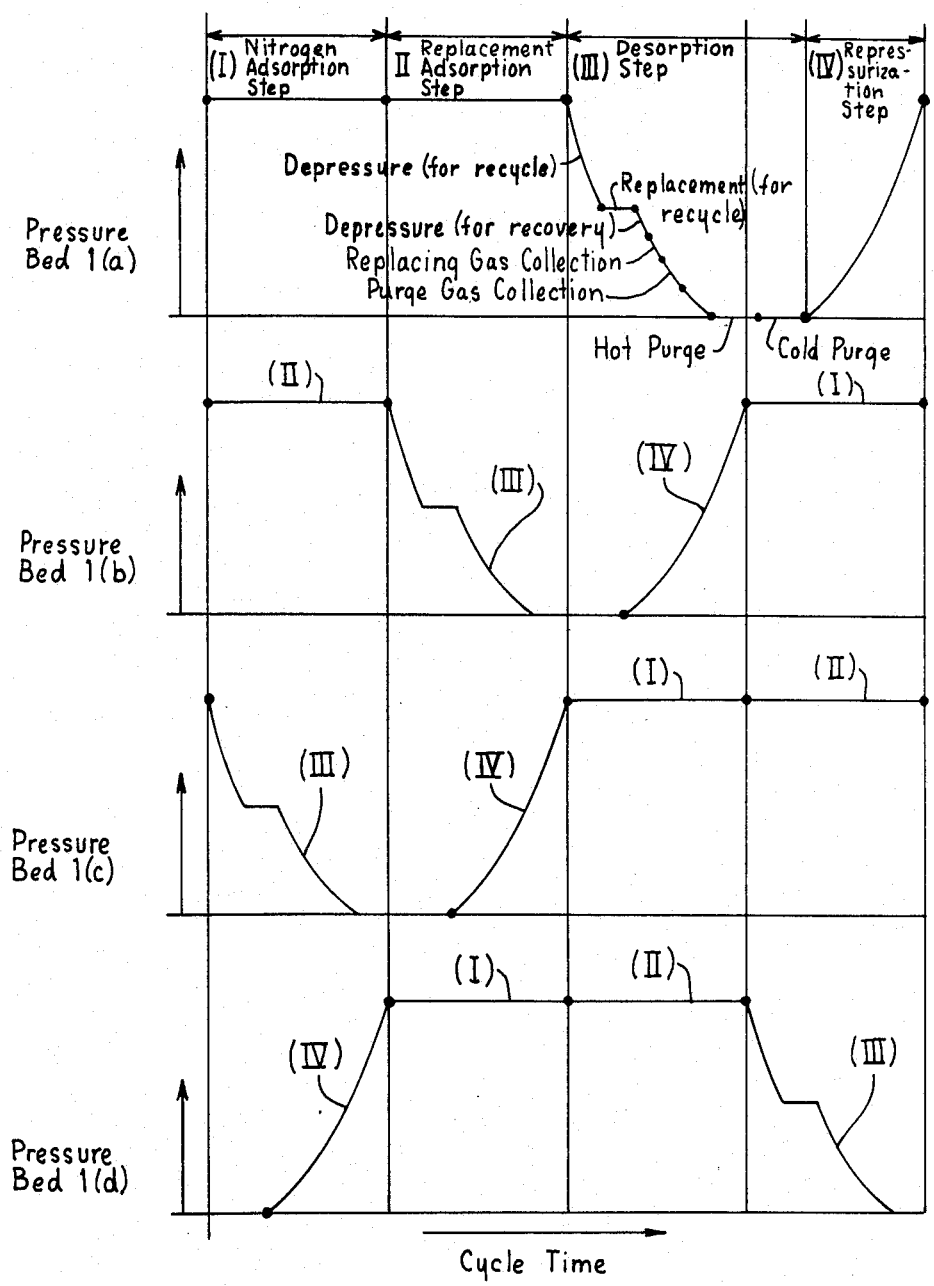
FIG. 3 is a diagram showing the cycle of steps for the adsorption-desorption unit shown in FIG. 2, wherein (I) indicates the nitrogen-adsorption step, (II) indicates the replacement-adsorption step, (III) indicates the desorption step and (IV) indicates the repressurization step.

FIG. 2 is a schematic diagram of an apparatus having four adsorbent beds for carrying out the process of the first embodiment of the present invention and FIG. 3 is a diagram showing the cycle of steps for the adsorption-desorption unit shown in FIG. 2.

In this exemplary design, the second procedure B described above are used in the replacement operation of the desorption step.

Referring to FIG. 2, it is assumed that adsorbent beds 1a, 1b, 1c, and 1d are undergoing the nitrogen-adsorption step (I), replacement-adsorption step (II), desorption step (III), and repressurization step (IV), respectively. It will be understood that each bed will be operated to perform the steps (I) to (IV) in sequence. The change-over of the beds from one step to another will be effected by changing the settings of the valves as necessary in a manner which will be evident to workers skilled in the art from the following description.

A feed gas enters the unit through a conduit 21 and is flowed to the bed 1b. Adsorbable components other than hydrogen and nitrogen are adsorbed onto the bed 1b in place of the nitrogen that was previously adsorbed thereon. A portion of the gas flowing from the bed 1b is fed into the bed 1a via a bypass conduit 23 while the remainder of the gas is directly discharged from the bed 1b through a hydrogen-nitrogen line 25. Nitrogen in the gas fed into the bed 1a is removed almost completely through adsorption and the gas is discharged from the bed 1a via a hydrogen line 24 so that it can be merged and mixed with the gas passing through the hydrogen-nitrogen line 25. The thus-merged gas constitutes a product gas flowing through a conduit 22.

When the adsorbent bed 1c begins to undergo depressurization in the desorption step, the gas thereby evolved is first discharged through a depressurized gas line 26. The gas then enters a recovery gas tank 2 via a conduit 27. The desorbed gas can thereafter be pressurized by a compressor 3 and recirculated as a feed gas.

Then, a replacing gas is fed into the bed 1c from a replacing gas tank 6 through a replacing gas line 29. The gas thus-expelled from bed 1c is also fed into the recovery gas tank 2 via the depressurized gas line 26 and the conduit 27 so as to be recirculated in the same fashion. The bed 1c is further depressurized and the thus-evolved gas enters a receiving tank 4 through a conduit 28. Thereafter, the gas is pressurized by a compressor 5 and then stored in the replacing gas tank 6 for use in the replacement procedure.

The bed 1c is further depressurized and the gas thus-evolved is fed into the adsorbent bed 1d which has undergone the desorption step and is undergoing the repressurization step, so that the hydrogen remaining in the voids of the bed 1c can ultimately be recovered.

The bed 1c is subjected to further depressurization and the gas thus-evolved contains almost no hydrogen and only a very slight amount of the strongly adsorbable components that have been desorbed from the bed. Thus, the evolved gas is composed essentially of nitrogen. This gas is suitable for use in purging the adsorbent bed 1c at the final stage of the desorption step. Specifically, this gas is fed into a hot purge gas tank 7 and a cold purge gas tank 8 wherein it is heated and cooled respectively.

The bed 1c is continuously subjected to further depressurization and the gas thereby evolved is discharged through a waste gas line 34 as a waste gas. This gas is also routed to the waste gas line 34 by way of a vacuum line 35, a vacuum tank 9, and a vacuum pump 10, as needed.

At the end of the depressurization-desorption, the purge gas is fed into the adsorbent bed 1c whereby the strongly adsorbable components that have been adsorbed in that bed are desorbed therefrom. Specifically, the hot purge gas is first introduced into the bed 1c through a hot purge gas line 31 to heat the bed and then the cold purge gas is fed into the bed 1c through a cold purge gas line 33 to cool the bed 1c. As the zone to which the purge gas is to be admitted, it is advantageous to feed the purge gas to the zone that the adsorption front of the strongly adsorbable components ultimately reached at the end of the replacement-adsorption step for the bed in question.

The adsorbent bed 1d, which has previously completed the desorption step, then undergoes the repressurization step. At the beginning of the repressurization step, the gas evolved from the bed 1c undergoing the further depressurization after the replacement is first introduced into the bed 1d. In this fashion, the gas which has remained in the neighborhood of the outlet portion of the bed 1c and has become low in hydrogen content by being mixed with the replacing gas is ultimately recovered. Accordingly, this introduction should be completed in a short time period.

The bed 1d is then filled with hydrogen gas. Hydrogen gas discharged from the bed 1a undergoing the nitrogen-adsorption step is first fed through a hydrogen line 24 into a buffer tank 11, via a conduit 37, at a constant flow rate. The hydrogen gas is then filled into the bed 1d from the buffer tank 11 through a filling gas line 38. In the meantime, the hydrogen gas from the hydrogen line 24 is continuously fed into the tank 11. When the pressure in the bed 1d has become equal to the pressure in the tank 11, the inlet and outlet valves of the tank 11 are closed and the valve 39 is opened so that the hydrogen gas from the hydrogen line 24 is directly introduced into the bed 1d. The pressure in the tank 11 is kept as it is, and, after completion of the filling of the hydrogen gas into the bed 1d and during the stoppage of the repressurization step, the hydrogen gas branched from the bed 1a is again fed into the tank 11 through the hydrogen line 24, thereby minimizing fluctuation of the flow of hydrogen gas through the hydrogen line 24.

The cycles of the foregoing steps are illustrated in the diagrams in FIG. 3. Referring to FIG. 3, the four graphs show the cycles of steps for the adsorbent beds 1a, 1b, 1c, and 1d, respectively, from the top thereof, the ordinate representing pressure while the abscissa denotes time for each of the cycles of steps.

Although a four-bed type adsorption-desorption unit is set forth in the foregoing description, it should not be construed that the adsorption-desorption unit according to the present invention is limited to the four-bed type of unit. For example, in the first embodiment, if carbon dioxide in the feed gas is sufficiently removed in advance and the strongly adsorbable components are present in the feed gas in such small amounts as to be relatively easily desorbed, a four-bed type unit may be used. Further, when carbon dioxide is not removed in advance and its concentration in the feed gas is high, it will be necessary to provide sufficient time for its desorption, and therefore, in some cases, five or six adsorbent beds will be required. However, it is not necessary to use seven or more adsorbent beds even when treating a synthesis gas from which carbon dioxide has not been previously removed. In any case, the four-bed or five-bed type system is most frequently used.

Activated carbon or a zeolite effective for adsorbing substances other than hydrogen is properly used as the adsorbent in the adsorption-desorption unit in the first embodiment of the present invention.

Adsorbable components in the feed gas to be subjected to the adsorption-desorption unit are divided into strongly adsorbable components, such as water, carbon dioxide, and carbon monoxide, and weakly adsorbable components, such as nitrogen, methane and argon. Among the strongly adsorbable components, water and carbon dioxide have strong affinities to the adsorbent and will not cause any problem in the adsorption step. However, careful attention should be paid to carbon monoxide, which is inferior in adsorption affinity in comparison with the former two components and will cause interference with the ammonia synthesis reaction when the amount of leakage of carbon monoxide through the adsorption-desorption unit is significant. Accordingly, in selecting the adsorbent, preference should be given to an adsorbent that is capable of adsorbing carbon monoxide most efficiently. On the other hand, methane and argon do not cause any fatal interference with the ammonia synthesis reaction, even if these gases are not removed in advance. Accordingly, the removal of these gases may be regarded as being of secondary importance.

Taking these factors into consideration, it is most preferable to pack activated carbon in a first layer and zeolite in a second layer in the adsorbent bed. Activated carbon is particularly effective in the adsorption of carbon dioxide and methane. The extreme reduction in methane content brought about by activated carbon may make it possible to accept some increase in the amount of methane that leaks through the steam reforming reaction steps, that is, steps (a) and (b) can be performed without maximizing the conversion of methane to carbon monoxide and hydrogen. This will also further mitigate the severity of the reaction conditions of the steam reforming reaction steps (a) and (b). On the other hand, zeolite is effective in the adsorption of nitrogen and carbon monoxide and minimizes the leakage of carbon monoxide through the adsorption-desorption unit.

As shown in the example below, the proportion of (1) the amount of the strongly adsorbable components that are adsorbed onto an adsorbent bed during the replacement-adsorption step, to (2) the total adsorbed amount, is approximately 15–25% when carbon dioxide has been previously removed from the feed gas and it is approximately 75% when carbon dioxide is not removed in advance.

No problem will be caused when carbon dioxide has been previously removed because there remains sufficient adsorbent which has adsorbed nitrogen that the other adsorbable components in the feed gas that is fed through replacement-adsorption adsorbent bed can be adsorbed by replacement of the nitrogen. However, when carbon dioxide is not removed in advance, in some cases, not enough adsorbent bed which has adsorbed nitrogen will remain to make it possible to remove the other adsorbable components in the feed gas by replacement of nitrogen. In such cases, there is a risk that carbon monoxide will not be completely adsorbed by replacement of the nitrogen and will leak out of the bed in a significant amount owing to the insufficient depth of adsorbent bed which has adsorbed nitrogen that is capable of being replaced by carbon monoxide.

In this sense, incomplete removal of carbon monoxide may possibly take place when the proportion of (1) the amount of the strongly adsorbable components to (2) the total amount of adsorbable components, is unduly large in the feed gas to be treated in the adsorption-desorption unit.

As is obvious from the foregoing detailed description, this process offers a process well adapted for refining in advance a feed gas for the synthesis of ammonia.

An example of the material balance for each component in the gaseous stream at important points in the process of the first embodiment of the invention (FIG. 2) are shown below for the cases (1) with previous removal of carbon dioxide and (2) without previous removal of carbon dioxide, when the synthesis gas, after the carbon monoxide shift conversion reaction step (c), is treated by the process described above.

The material balance is obtained on the basis that: nitrogen is present in the synthesis gas in an amount which is 40% excess of the amount of nitrogen required for ammonia synthesis; the adsorbable components in the synthesis gas are all adsorbed; nitrogen previously adsorbed on an adsorbent bed is replaced by the strongly adsorbable components in the molar ratio of 1:1 in the replacement-adsorption step; the loss of hydrogen, etc. is disregarded; and the material balance is expressed in terms of kg-mol.

EXAMPLE 1: WITH PREVIOUS REMOVAL OF CARBON DIOXIDE

| Line Number | 21 | a | b | 23 | 24 | 25 | 22 |
|---|---|---|---|---|---|---|---|
| Component | | | | | | | |
| $H_2O$ | 0.1 | 0.1 | — | — | — | — | — |
| $CO_2$ | 0.1 | 0.1 | — | — | — | — | — |
| CO | 0.6 | 0.6 | — | — | — | — | — |
| $CH_4$ | 0.4 | 0.4 | — | — | — | — | — |
| Ar | 0.4 | 0.4 | — | — | — | — | — |
| $H_2$ | 67.2 | — | 67.2 | 22.7 | 22.7 | 44.5 | 67.2 |

-continued

| Line Number | 21 | a | b | 23 | 24 | 25 | 22 |
|---|---|---|---|---|---|---|---|
| N₂ | 31.3 | 8.9 | 33.8 | 11.4 | — | 22.4 | 22.4 |

EXAMPLE 2: WITHOUT PREVIOUS REMOVAL OF CARBON DIOXIDE

| Line Number | 21 | a | b | 23 | 24 | 25 | 22 |
|---|---|---|---|---|---|---|---|
| Component | | | | | | | |
| $H_2O$ | 0.1 | 0.1 | — | — | — | — | — |
| $CO_2$ | 20.0 | 20.0 | — | — | — | — | — |
| CO | 0.5 | 0.5 | — | — | — | — | — |
| $CH_4$ | 0.4 | 0.4 | — | — | — | — | — |
| Ar | 0.3 | 0.3 | — | — | — | — | — |
| $H_2$ | 53.8 | — | 53.8 | 33.4 | 33.4 | 20.4 | 53.8 |
| $N_2$ | 25.0 | 7.1 | 47.2 | 29.3 | — | 17.9 | 17.9 |

Note:
Line numbers are identical to those shown in FIG. 1.
The letter a represents components removed by the replacement-adsorption and the letter b denotes components at the outlet of the bed undergoing the replacement-adsorption step, e.g., bed 1b in FIG. 1.

The second embodiment of the present invention will be described hereinafter. Namely, described hereinafter is a process wherein excess nitrogen is removed, by means of an adsorption-desorption unit, from an unreacted synthesis gas after the removal of ammonia in the step (e), that is, within an ammonia synthesis loop.

In this process, a portion of the synthesis gas, which has undergone ammonia synthesis and from which ammonia has been removed, is flowed through an adsorption-desorption unit, thereby almost completely removing nitrogen and non-ammonia producing gaseous components (i.e., methane and argon). If this portion of the synthesis gas contains residual ammonia, that will be removed also. The ratio of hydrogen to nitrogen in the gas for undergoing ammonia synthesis is adjusted by controlling the amount of the gas that is fed through the adsorption-desorption unit.

When separating produced ammonia from the gas which has undergone ammonia synthesis, there are two cases of (1) incomplete separation and (2) almost complete separation, depending on the procedure used for separating ammonia, as follows:

(1) Incomplete separation: ammonia is insufficiently removed in all of the conventional ammonia synthesis processes. In this case, ammonia in the synthesis gas that has undergone ammonia synthesis is separated through liquefaction by cooling said gas. As a result, one to several percent, generally two to three percent of ammonia remain in the resulting synthesis gas.

(2) Almost complete separation: there has been no case wherein almost complete separation of ammonia is carried out on an industrial scale from the gas after ammonia synthesis. The process categorized herein separates ammonia nearly completely from the gas that has undergone ammonia synthesis, by means of adsorption or absorption.

Japanese Patent Laid-Open No. 60299/1979 describes an exemplary water absorption process.

Japanese Patent Application No. 155548/1983 applied for by the same inventor as that of the present invention discloses examples of the process wherein almost all of the ammonia is removed, by means of an adsorption-desorption process, from a synthesis gas that has undergone an ammonia synthesis reaction. The concentration of ammonia in the synthesis product gas from which ammonia has been removed is generally very low when an adsorption-desorption process is employed in the separation of the ammonia.

In contrast, the concentration of residual ammonia in the synthesis product gas that has undergone water absorption to separate ammonia is slightly higher than the case when the ammonia removal was accomplished by adsorption, but it is still considerably lower than is the case with the liquefaction separation as described in the above (1).

In the above two cases, the gas to be separated by adsorption includes nitrogen, methane and argon in addition to a small amount of ammonia after the incomplete removal of ammonia in the above manner (1), and includes nitrogen, methane and argon after ammonia in the gas has been removed almost completely in the above fashion (2). The procedure for treating the gas is different in each case.

The process for treating the gas resulted from the case (1) includes a process comprising separating ammonia by water absorption followed by the removal of nitrogen, methane and argon and a process comprising separating all of these gaseous components simultaneously by means of an adsorption-desorption unit.

Although the former process involves no process irrationalities in composing the process, it is attended by rather complicated problems in the practice of the process. Since the gas obtained in the adsorption-desorption unit is a gaseous mixture comprising ammonia and other gaseous components at low pressure, the latter process involves complex problems in separating ammonia from the other gaseous components from the standpoint of both process and equipment.

In the case (2) wherein the gaseous components to be removed are nitrogen, methane, argon and only a small amount of ammonia, the separation can advantageously be attained by the application of an adsorption-desorption process. Although nitrogen, methane and argon are somewhat weaker in adsorption affinity, these gaseous components can be separated through adsorption without serious difficulties by a conventional pressure swing adsorption-desorption process, in the case where the adsorbent bed used in the process is large enough to adsorb all of these components. Further, the desorption of these components is easy because of their relatively weak adsorption affinities for the adsorbent.

If it is possible to remove the remaining ammonia in advance by a proper means after its incomplete removal as in the case (1), a pressure swing adsorption-desorption unit can be employed for the subsequent treatment as in the case (2).

As a means for this previous removal of ammonia, it is preferable to use type 3A zeolite for selectively separating ammonia and water through adsorption. Type 3A zeolite has a pore diameter of 3Å (angstrom units) so that molecules other than those of hydrogen, helium, water and ammonia cannot enter its pores. Consequently, only ammonia and water are adsorbed selectively and the other gaseous components are not adsorbed in this case. In other words, ammonia and water will be selectively adsorbed by an adsorption-desorption unit using type 3A zeolite as an adsorbent. On the other hand, the desorption of this previously adsorbed ammonia and water can advantageously be effected without any pressure relief or else by reducing its pressure down to, at the lowest, a pressure under that at which ammonia is liquefied at ambient temperature, thereby facilitating the liquefaction of ammonia. It is preferable to raise the liquefaction pressure above said pressure to some extent, because a considerable amount of non-condensable gaseous components are contained in the desorbed ammonia.

As a means for effecting this desorption, it is preferable to heat the adsorbent bed containing adsorbed ammonia so as to expel the adsorbed ammonia from the bed. Waste heat, such as the heat contained in a product gas from an ammonia synthesis reactor, can advantageously be utilized as a heat source for this purpose.

The synthesis gas, from which the ammonia has been removed, can now be subjected to the primary adsorption-desorption unit in order to favorably adjust its composition to that adapted for the synthesis of ammonia, regardless of the incompleteness of the previous ammonia removal.

Figure 4:
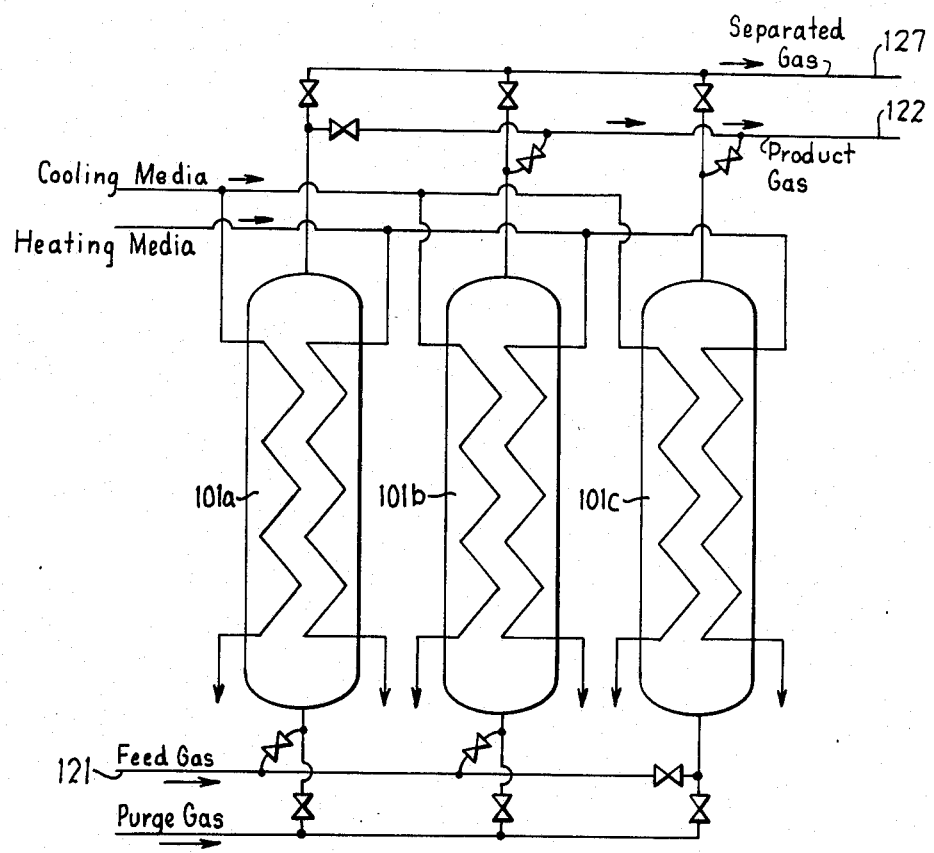
FIG. 4 is a schematic diagram of an adsorption-desorption unit for separating ammonia from a synthesis gas containing a small amount of ammonia, which unit is used in the second embodiment of the invention.

The process according to the second embodiment of the present invention will be illustrated in more detail with reference to a concrete example. FIG. 4 is a schematic diagram of an adsorption-desorption unit for separating ammonia and water from a synthesis gas containing a small amount of ammonia.

Adsorbent beds 101a, 101b, and 101c of an adsorption-desorption unit 101 contain type 3A zeolite and are provided with heat transfer tubes both for heating and for cooling within the adsorbent beds.

The gas to be treated in the unit is introduced via a conduit 121 into an adsorbent bed, such as bed 101a, that is undergoing the adsorption step wherein ammonia in the gas is separated through adsorption and the product gas is discharged therefrom via a conduit 122. When the adsorbent bed 101a becomes saturated, it is switched to undergo the desorption step wherein it is heated so as to desorb ammonia, which is removed through line 127. Thereafter, the adsorbent bed 101a is cooled so that it is cycled to undergo the adsorption step again. In FIG. 4, bed 101b is undergoing cooling to prepare it for the next ammonia adsorption step and bed 101c is undergoing heating to desorb the ammonia.

The desorbed gas containing ammonia is transported to a liquefier unit with the help of a purge gas, and the ammonia is separated by liquefaction. The product gas flowing from ammonia synthesis reactor is advantageously used as a heating medium for the desorption step as well as for heating the purge gas.

Figure 5:
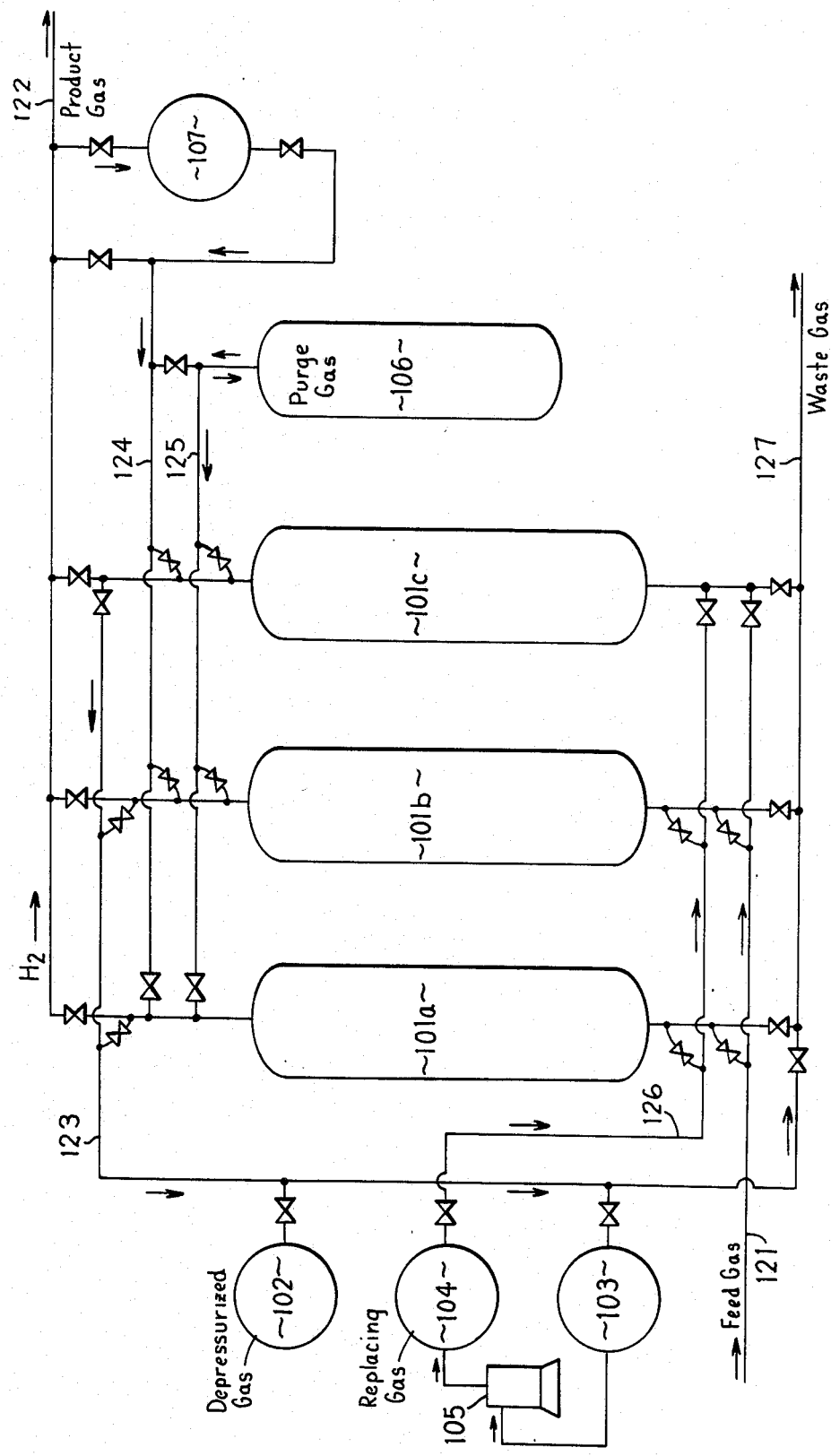
FIG. 5 is a pressure swing adsorption-desorption unit, used in the second embodiment of the invention, for separating nitrogen, methane, and argon from a gaseous mixture containing these components but almost no ammonia.

FIG. 5 is a schematic diagram of an exemplary pressure swing adsorption-desorption unit for separating nitrogen, methane and argon from a gaseous mixture containing those components, but containing almost no ammonia.

Figure 6:
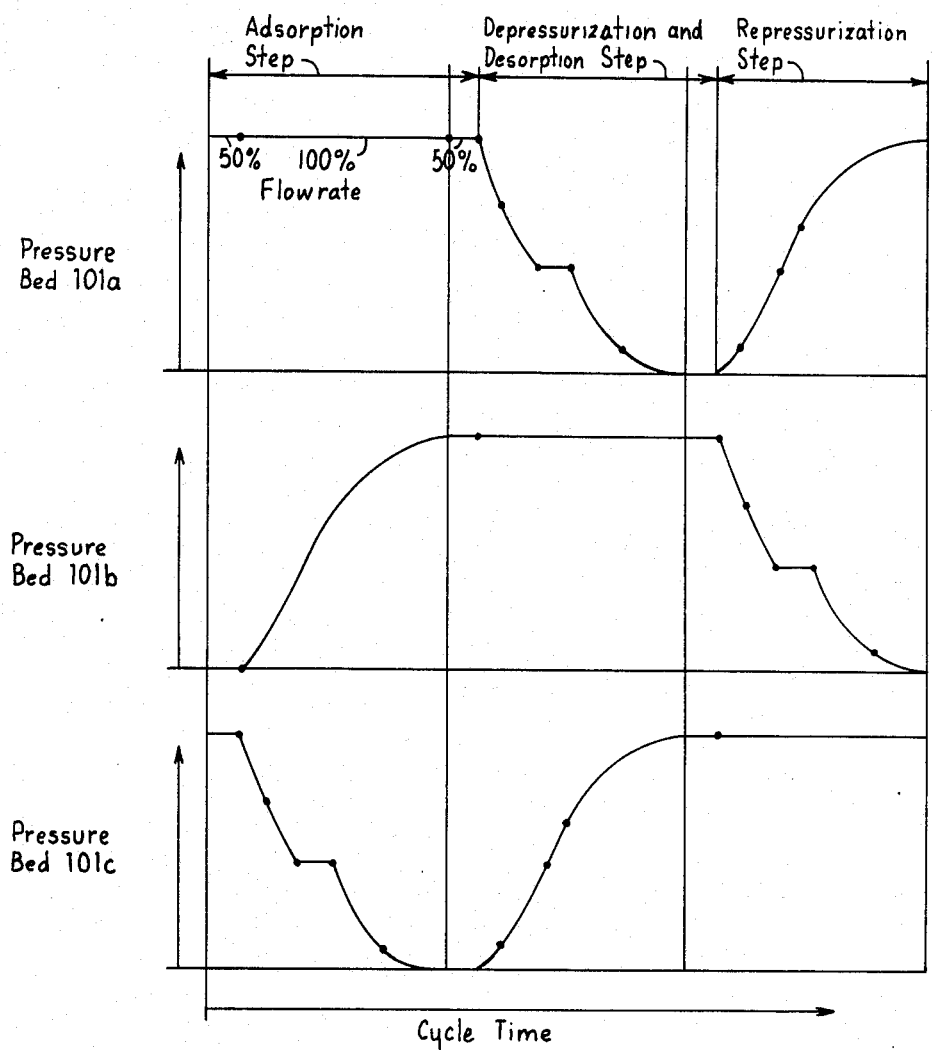
FIG. 6 is a diagram showing the cycle of steps for the adsorption-desorption unit shown in FIG. 5.

FIG. 6 is a diagram showing the cycles of steps for the adsorption-desorption unit shown in FIG. 5.

A conventional pressure swing adsorption-desorption unit can also be used as the adsorption-desorption unit for separating such a gaseous mixture. However, it should be noted that when a pressure swing adsorption-desorption unit is incorporated in an ammonia synthesis loop as described above, the rate of hydrogen recovery achieved by the unit is particularly important. The unit shown in FIG. 5 affords a high performance in the hydrogen recovery in relation to its simplicity.

The unit comprises three adsorbent beds, 101a, 101b, and 101c. The cycle of steps for operating the unit is hereinafter described with reference principally to the bed 101a, it being understood that beds 101b and 101c are operated through the same cycle of steps in sequence.

The gas to be treated in the unit enters the bed 101a via a conduit 121. The adsorbable components in the feed gas, which are nitrogen, methane, and argon, are nearly completely adsorbed on the bed 101a, thereby allowing almost pure hydrogen to flow out of the unit via a conduit 122. When the bed 101a becomes almost saturated and the adsorbable components begin to leak out, the gas stream fed to the bed 101a is reduced in amount to about one-half of the normal flow rate and the flow of the feed gas to the bed 101b is simultaneously started at a rate which is about one-half of the normal flow rate.

By reducing the rate of gas flow to the bed 101a to one-half of the normal rate in the above manner, the usual volume of the portion of the bed 101a, that is, the portion that does not contain adsorbed substances, can be minimized when it is switched over to begin the desorption step. As a matter of course, a small amount of the adsorbable components leak through the bed 101a. However, the amount of the leaked components is reduced to above one-half in comparison with the case in which the gas is allowed to flow through the bed 101a at the normal flow rate. This amount of leakage will not cause appreciable interference with the ammonia synthesis reaction and so will not raise any significant problem.

The duration of the time period during which the two beds are used in parallel is dependent on the tolerance of the ammonia synthesis reaction for the leakage of the adsorbable components, which tolerance should be determined in advance. In any event, this time period should be short. The bed 101a is then switched over to undergo the depressurization-desorption step while the bed 101b continues the adsorption and it receives the total amount of gas at the normal flow rate.

The gas evolved from the adsorbent bed 101a by depressurization is allowed to flow into a depressurized gas tank 102 and then, when the pressure in the bed 101a becomes equal to that in the tank 102, the evolved gas is allowed to flow into the adsorbent bed 101c that is undergoing the repressurization step. When the pressures of both of the beds 101a and 101c become equal to each other, the gas is allowed to flow from the depressurized gas tank 102 to the bed 101c until the pressure of the bed 101c is equal to that of the tank 102. Then, a replacing gas is fed from a replacing gas tank 104 to the bed 101a through the inlet thereof, thereby expelling the gas present in the voids of the bed 101a. The thus-expelled gas is allowed to flow into a purge gas tank 106. Almost all of the hydrogen remaining in the bed 101a at the end of the adsorption step is recovered by this gas replacement.

The purge tank 106 is filled with packing substances, such as honeycombs or pipes, disposed in the axial direction thereof so that the mixing of gas may not take place in the axial direction thereof. Accordingly, the gas fed into the tank 106 is stored such that its composition gradient is maintained within the tank 106. As a result, the concentration of hydrogen is relatively high in the gas located in the zone remote from the inlet of the tank 106 and is relatively low in the gas located in the zone adjacent to the inlet of the tank 106.

After completion of the gas replacement, the bed 101a is further depressurized. The thus-evolved gas contains almost no hydrogen but it contains weakly adsorbable components, such as nitrogen and argon. This evolved gas, being suitable for use as the replacing gas, is introduced into a replacing gas receiving tank 103, then pressurized in a replacing gas compressor 105, and thereafter stored in the replacing gas tank 104 to be used for the gas replacement.

The bed 101a is then further depressurized, and the gas thereby desorbed is discharged from the unit via a waste gas line 127. When the pressure in the bed 101a approaches the predetermined lowest level, the gas stored in the purge gas tank 106 is introduced into the bed 101a through a purge line 125, thereby expelling the desorbed gas remaining in the bed 101a to the waste gas line 127. As aforementioned, the concentration of hydrogen in the purge gas is low in the neighborhood of the inlet of the purge gas tank 106 and is high in the opposite portion to the inlet thereof. Consequently, it is advantageous to stop the gas discharge to the waste gas line 127 at an appropriate stage of the purging operation and hold a relatively high hydrogen-content gas within the bed 101a before undergoing the repressurization step.

Thereafter, into the bed 101a is introduced, first, the gas evolved from the bed 101b by depressurization, and then the gas from the depressurized gas tank 102. Then, the product gas, hydrogen, is fed into the bed 101a from a hydrogen gas tank 107 via a filling line 124.

The hydrogen tank 107 is installed as a buffer tank in order to limit fluctuation of gas flow through the product gas line 122.

As the adsorbent used in this adsorption-desorption unit, it is preferable to use an adsorbent having a large adsorption affinity for nitrogen, for example, zeolite or the like, because efficient nitrogen adsorption is of primary importance in the process of the second embodiment. Further, it is also possible to use an adsorption-desorption unit having four beds or more, the operating cycle of which is designed on the basis of approximately the same concept as in the foregoing three-bed type unit, depending on the scale of the unit.

This adsorption-desorption unit, which is based on a relatively simple process, can afford a high performance of the rate of hydrogen recovery. This is attributable to the facts that: (1) two adsorbent beds are subjected to adsorption, in parallel, for a short period of time at the final stage of the adsorption step of one bed of said two adsorbent beds, thereby minimizing the volume of the unused portion of said one bed; (2) a hydrogen-containing gas is recovered by the replacement of gas at an interval during depressurization; and (3) the thus-recovered hydrogen-containing gas is effectively utilized as a purge gas in the desorption of an adsorbent bed.

The process of the present invention can advantageously be incorporated in a process for the separation of ammonia using an adsorption-desorption unit.

Figure 7:
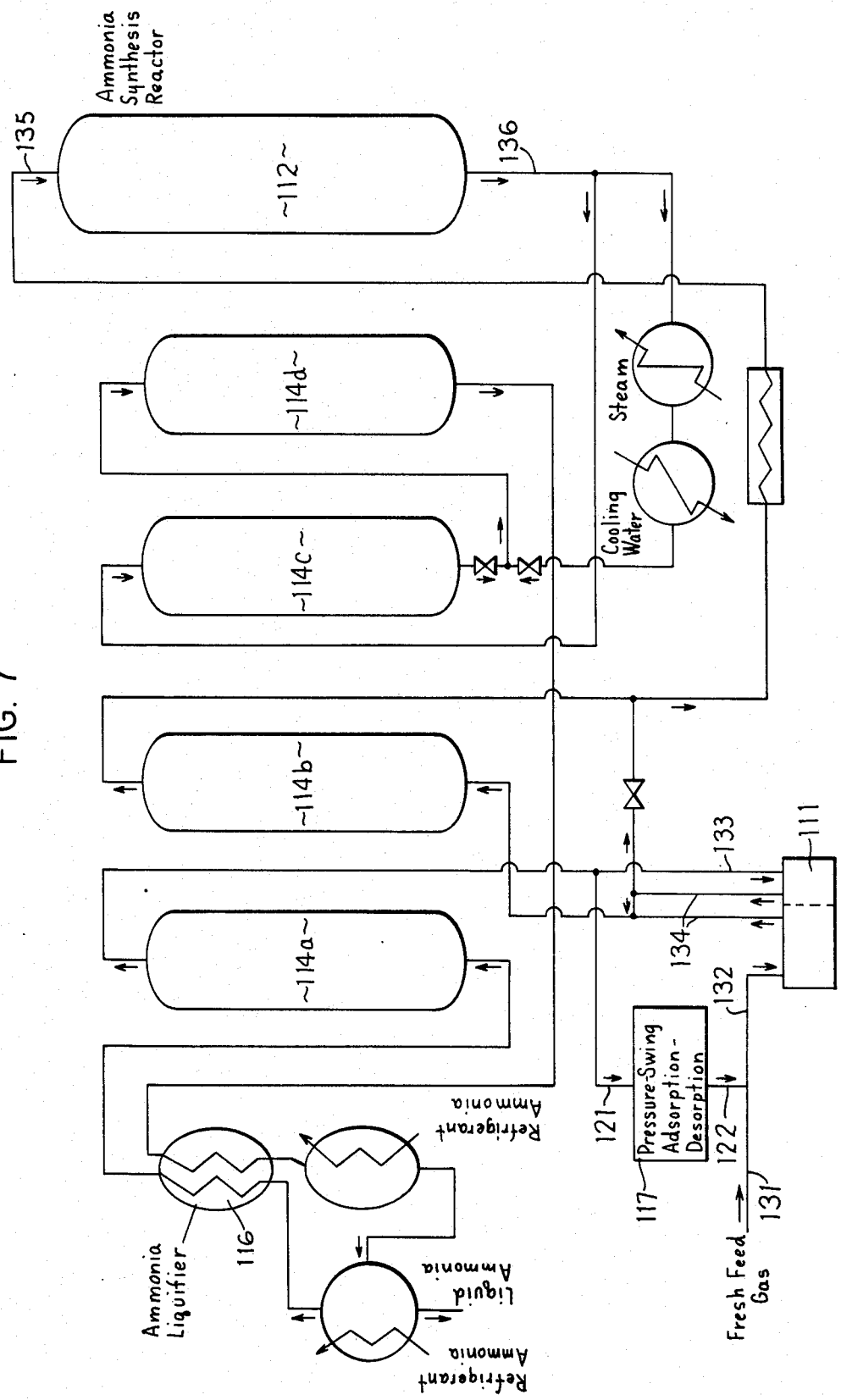
FIG. 7 is a schematic flow diagram of an apparatus wherein a thermal swing adsorption-desorption unit for separating produced ammonia is incorporated in the second embodiment of the present invention.

FIG. 7 is a schematic diagram illustrating the case wherein the second embodiment of the present invention is incorporated in a process for the separation of ammonia using an adsorption-desorption unit.

A high-temperature ammonia synthesis product gas flowing from an ammonia synthesis reactor 112 is fed sequentially through adsorbent beds 114c and 114d, both of which are undergoing the desorption step, thereby desorbing ammonia previously adsorbed on the beds. The gas, which is thus increased in ammonia concentration, is then introduced into an ammonia liquefier unit 116 wherein the greater part of ammonia in the gas is liquefied. The gas discharged from the liquefier unit 116 is fed sequentially through adsorbent beds 114a and 114b, both of which are undergoing the adsorption step in the adsorption-desorption unit. The remaining unliquefied ammonia in the gas is almost completely removed from the gas by adsorption in both beds. The resulting gas is discharged from the adsorption-desorption unit and is pressurized in a synthesis gas compressor 111 to be recirculated to the ammonia synthesis reactor 112.

In the desorption step, the desorption is carried out substantially in the primary adsorbent bed 114c, that is, the first bed that is connected in the portion of the unit that is undergoing desorption and the secondary adsorbent bed 114d is preheated by receiving the desorbed gas discharged from the bed 114c. Further, in the adsorption step, the adsorption is effected substantially in the primary adsorbent bed 114a and the secondary adsorbent bed 114b, which has been heated in the preceding desorption step, is cooled by receiving the discharged gas from the bed 114a.

The adsorbent beds are switched to undergo their respective subsequent steps when the bed that is undergoing the adsorption step becomes saturated.

A portion of the synthesis gas that flows out of the adsorbent bed 114a is fed through a conduit 121 into a pressure swing adsorption-desorption unit 117 wherein nitrogen, methane and argon contained in the gas are almost completely adsorbed and separated. The thus-treated synthesis gas is discharged from the unit 117 through a conduit 122 and is merged with a fresh feed gas passing through a conduit 131. The resulting synthesis gas is passed via a conduit 132 to a synthesis gas compressor 111 wherein it is pressurized to be recirculated to the ammonia synthesis reactor 112.

The fresh synthesis gas flowing through the conduit 131 contains a large excess of nitrogen, while the treated synthesis gas fed through the conduit 122 consists essentially of hydrogen. By mixing the fresh synthesis gas with the treated synthesis gas in the proper proportions, the hydrogen-to-nitrogen ratio in the resulting synthesis gas can be adjusted to the stoichiometric ratio for the synthesis of ammonia, so that the resulting synthesis gas is advantageously fed to the ammonia synthesis reactor 112 through a conduit 132. The adjustment of the ratio is readily achieved by controlling the amount of the synthesis gas fed through the conduit 121 to be treated in the unit 117. At the same time, methane and argon are also effectively removed from the synthesis gas in the unit 117, with the result being that the concentration of inert gas components can be kept at a low level in the ammonia synthesis loop.

There is no significant problem in incorporating the pressure swing adsorption-desorption unit 117 between the adsorbent beds 114a-d and the synthesis gas compressor 111, because the pressure drop across the unit 117 can be made small.

As shown in the material balance below, the concentration of inert gas components is kept as low as several percent at the inlet of the ammonia synthesis reactor 112, even though the concentration of methane in the fresh synthesis gas is as high as 2.41%.

Thus, by employing the process of the present invention as described above in combination with the effect of reducing the load of the primary reformer, it becomes possible to increase the operation pressure of the reformers and to effect ammonia synthesis at a lower pressure.

The advantages of the latter treatment procedure of the second embodiment of the present invention as described above are as follows:

(1) The amount of nitrogen to be removed by this treatment procedure must be practically equal to the amount of excess nitrogen in the fresh synthesis gas. Hence, the amount of gas to be treated by this treatment procedure varies with the excess of nitrogen in the fresh synthesis gas, but it is generally less than 50% of the amount of the fresh synthesis gas. As seen in the material balance below, when the excess rate of nitrogen is 40%, the amount of gas to be treated is 41% of the amount of the fresh synthesis gas.

When the synthesis gas is treated by the low temperature separation method prior to entering the ammonia synthesis loop, the total amount of fresh synthesis gas must inevitably be treated by that method. In the case of treating the ammonia synthesis gas by that method within the ammonia synthesis loop, nitrogen cannot be removed in such a large amount due to the limitation of the low temperature that is practically attainable within the synthesis loop. If the drop in pressure of the ammonia synthesis gas is made larger in an expander used in the low temperature separation method, a lower temperature can be obtained and nitrogen in the gas can thus be removed in a larger amount, but the power required for raising the pressure of the synthesis gas is greatly and disadvantageously increased. Accordingly, in view of the efficiency of the method of the invention, there is no significant difference between the two cases in the amount of gas to be treated by the invention method. Therefore, the amount of gas to be treated by the treatment procedure of the present invention is decreased to a large extent as compared to the low temperature separation method.

The smaller amount of gas to be treated advantageously makes the apparatus that is used to treat the gas less costly and at the same time makes it possible to reduce the loss of hydrogen, which is generally proportional to the amount of gas to be treated.

(2) Generally speaking, the pressure drop across an adsorption-desorption unit is smaller than that across an apparatus of the low temperature separation method. Particularly because the gas volume to be treated is relatively small, the adsorption-desorption unit can be so designed that the pressure drop is made even smaller as compared with the low temperature separation method.

Consequently, the treated synthesis gas from the adsorption-desorption unit can be easily merged with the fresh synthesis gas at the inlet of the synthesis gas compressor, as a result of which only a slightly increased power is required for circulating the treated synthesis gas.

(3) In this pressure swing adsorption-desorption method, not only nitrogen but also methane and argon are almost completely adsorbed. As a result, the concentration of methane and argon in the synthesis loop can be kept at a low level. This makes it possible for the concentration of methane in the fresh synthesis gas and therefore the leakage of methane from the secondary reformer to be a higher level.

By combining the effect of this treatment procedure with the effect of the increased amount of air fed to the secondary reformer, it becomes possible optionally to realize any of such very favorable results as (1) an increase in the operating pressure of the reformers, (2) a decrease in the operating temperature of the primary reformer and (3) a decrease in the steam-to-carbon ratio in the primary reformer.

(4) The adverse effect caused by the excess nitrogen seen in most of the conventional ammonia synthesis processes can be completely eliminated, because the synthesis gas is fed into the ammonia synthesis reactor after adjusting its hydrogen-to-nitrogen molar ratio by merging the treated synthesis gas consisting essentially of hydrogen with the fresh synthesis gas which contains an excess of nitrogen. The adjustment of the hydrogen to nitrogen molar ratio is readily achieved by this treatment.

(5) When the synthesis gas to be treated contains ammonia, the ammonia is separated by the combination of another adsorption-desorption system and a cooler-liquefier unit in the manner described above, which makes unnecessary other means of ammonia removal, such as water absorption, and provides a simplified process for treating an ammonia-containing synthesis gas in the ammonia synthesis loop.

Set forth in the following is a material balance of an ammonia plant having a capacity of 1000 tons/day, the plant employing the process of the second embodiment of the present invention as shown in FIG. 7.

The material balance is obtained on the basis of the following conditions:

| | |
|---|---|
| Excess rate of nitrogen in the fresh synthesis gas | 40% |
| Rate of hydrogen recovery in the pressure swing adsorption unit | 95% |
| Concentration of ammonia at the inlet of the ammonia synthesis reactor | 0% |
| Concentration of ammonia at the outlet of the ammonia synthesis reactor | 10% |
| Pressure of the synthesis gas at the outlet of the synthesis gas compressor | 55 kg/cm$^2$g |

Numerals shown as (131) and the like represent the reference numerals of the conduits shown in FIG. 7.

| | Fresh synthesis gas (131) | | Conventional process (for reference) |
|---|---|---|---|
| | vol. % | Nm$^3$/hr | vol. % |
| H$_2$ | 66.23 | 84,170 | 73.94 |
| N$_2$ | 30.88 | 39,244 | 24.65 |
| CH$_4$ | 2.41 | 3,069 | 1.09 |
| Ar | 0.47 | 600 | 0.32 |
| Total | 100.00 | 127,083 | 100.00 |

| | Adsorption unit inlet (121) | | Adsorption unit outlet (122) |
|---|---|---|---|
| | vol. % | Nm$^3$/hr | Nm$^3$/hr |
| H$_2$ | 69.6 | 36,252 | 34,439 |
| N$_2$ | 23.2 | 12,084 | 292 |
| CH$_4$ | 6.0 | 3,125 | 56 |
| Ar | 1.2 | 625 | 25 |
| Total | 100.0 | 52,086 | 34,182 |

| | Synthesis gas compressor inlet (132) Nm$^3$/hr | Recycle gas (133) Nm$^3$/hr |
|---|---|---|
| H$_2$ | 118,609 | 307,652 |
| N$_2$ | 39,536 | 102,551 |
| CH$_4$ | 3,125 | 26,522 |
| Ar | 625 | 5,304 |
| Total | 161,895 | 442,029 |

| | Synthesis reactor inlet (135) | | Synthesis reactor outlet (136) |
|---|---|---|---|
| | vol. % | Nm$^3$/hr | Nm$^3$/hr |
| H$_2$ | 70.58 | 426,261 | 343,908 |
| N$_2$ | 23.53 | 142,087 | 114,636 |
| CH$_4$ | 4.91 | 29,647 | 29,647 |
| Ar | 0.98 | 5,929 | 5,929 |

-continued

| | | | |
|---|---|---|---|
| NH₃ | | | 54,902 |
| Total | 100.00 | 603,924 | 549,020 |

The incorporation of the process of the third embodiment of the present invention, which embodiment is described in detail above, in an ammonia synthesis unit will be described in the following.

Figure 8:
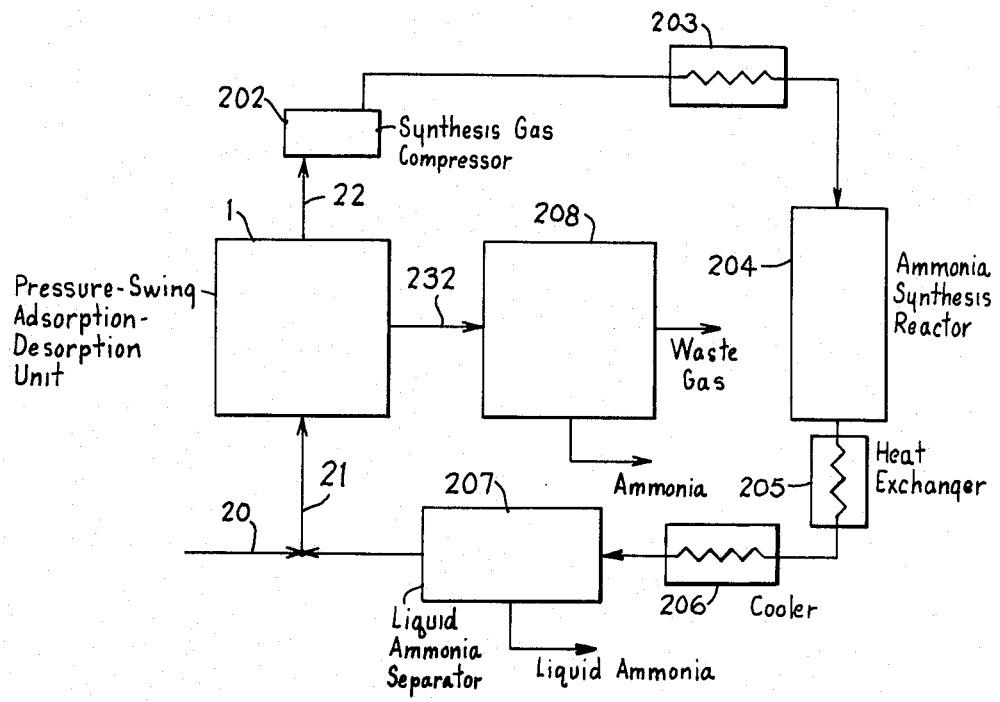
FIG. 8 is a block diagram of the process sequence in an ammonia synthesis loop which incorporates the third embodiment of the present invention.

FIG. 8 is a block diagram showing a process sequence in an ammonia synthesis loop which incorporates an adsorption-desorption unit and its associated apparatus. In the case shown in FIG. 8, the pressure of the fresh synthesis gas passing through a conduit 20 is so high that the gas can be directly passed into the ammonia synthesis loop. However, when the pressure of the circulating synthesis gas through the loop is considerably higher than that of the fresh synthesis gas, the fresh synthesis gas is fed to the inlet of a synthesis gas compressor while the circulating synthesis gas is introduced into an inter-stage of said compressor, so that the both gases can be merged within the compressor, in a conventional fashion.

The fresh ammonia synthesis gas passing through a conduit 20 is merged with a synthesis gas that is circulating through the ammonia synthesis loop and is fed into a pressure swing adsorption-desorption unit 1 via a conduit 21. The synthesis gas discharged from the unit 1 is pressurized in a synthesis gas compressor 202 and fed through a heat exchanger 203 to an ammonia synthesis reactor 204 wherein ammonia is produced. The ammonia-containing synthesis gas discharged from the reactor 204 is introduced sequentially into a heat exchanger 205 and a cooler 206 wherein more than one-half of the produced ammonia contained in the gas is liquefied. The liquefied ammonia is separated in the separator 207. The resulting synthesis gas containing unliquefied ammonia is then merged with the fresh synthesis gas to be recirculated to the adsorption-desorption unit 1 in the same manner as described above.

It is required that the amount of carbon dioxide in the fresh synthesis gas passing through the conduit 20 be minimized prior to entry of the gas into the ammonia synthesis loop. However, it is permissible that a small amount of carbon monoxide and water are present in the fresh synthesis gas.

It is not critical to specify the amount of ammonia that is separated in a liquid ammonia separator 207. This is because said amount is only related to the capacity of the adsorption-desorption unit 1 and does not concern the gist of the present invention.

It is also possible to treat the total amount of the produced ammonia in the pressure swing adsorption-desorption unit 1 of the present invention. In this case, the liquid ammonia separator 207 can be omitted in FIG. 8.

In contrast, it is also possible to separate all of the produced ammonia contained in the gas at the position of the liquid ammonia separator 207. This is accomplished by means of an absorption-separation unit using water as an absorbent, in lieu of the liquid ammonia separator 207 that utilizes cooling. As a result, water vapor is mixed into the synthesis gas, but this water can be completely removed by the adsorption-desorption unit 1 and, hence, will not obstruct the ammonia synthesis reaction. A somewhat increased amount of water vapor may enter the adsorption-desorption unit so that it is preferred to purge the adsorbent bed, containing adsorbed water, with a hot gas in the desorption step.

The advantage of this procedure is that the amount of components to be removed in the adsorption-desorption unit 1 is greatly reduced and in consequence the capacity of the adsorption-desorption unit is also greatly reduced, because the greater part of the ammonia is separated by the water absorption.

Further, as a means for separating ammonia almost completely from the synthesis gas before the gas enters the adsorption-desorption unit 1, it is particularly effective to keep the temperature of the absorbent water at as low a temperature as possible, preferably at a temperature in the range of 10° to 0° C.

Thus, the absorption of ammonia by a low temperature absorbent water in this manner allows the amounts of water and ammonia flowing into the adsorption-desorption unit 1 to be reduced to a minimum. Moreover, these reduced amounts as well as the low temperature of the gas will cause a significant reduction in the amount of adsorbent used in the adsorption-desorption unit 1.

The leakage of ammonia from the absorption column can thus be minimized when an ammonia-containing synthesis gas is treated with a low-temperature absorbent water, so that the loss of ammonia accompanying a desorbed waste gas from the subsequent adsorption-desorption unit 1 can be ignored.

Although a refrigerator is needed in order to obtain a low-temperature absorbent water, said arrangement is still beneficial from the viewpoint of plant cost because of the elimination of the recovery unit of ammonia from the desorbed waste gas and the reduction in the size of the adsorption-desorption unit 1.

Alternatively, it is also effective to use another, secondary, adsorption-desorption unit subsequent to the ammonia absorption unit that is using water as the absorbent in the following manner. Specifically, in the secondary, adsorption-desorption unit, only water and ammonia are removed by an adsorbent bed packed with adsorbent, preferably type 3A zeolite, because this zeolite adsorbs water and ammonia selectively. However, a conventional adsorbent capable of adsorbing water and ammonia can be used for this purpose. Because adsorbed components are desorbed in the desorption step and flow into the water absorption unit, the total amount of adsorbed components other than water and ammonia are kept unchanged in the synthesis loop. Zeolite, especially type 3A zeolite, is most preferably used. A major portion of the synthesis gas treated in this secondary adsorption-desorption unit is directly fed to the synthesis gas compressor 202 to be circulated to the synthesis reactor 240 and the remaining smaller portion is combined with a fresh synthesis gas and is fed to the primary adsorption-desorption unit 1 which mainly removes nitrogen and inert gaseous components.

The secondary adsorption-desorption unit employs a plurality of, e.g. three, adsorbent beds as one set, each of which beds undergoes each of the steps of adsorption, heating-desorption and cooling in a sequential and cyclic manner. This unit is similar in principle to the unit described in the second embodiment of the invention and in FIG. 4.

Desorption is effected by flowing a hot gas to effect heating-desorption without pressure relief in this unit. A portion of the circulating synthesis gas which does not contain ammonia is taken out of the synthesis loop. This portion of the gas is heated and then is fed into the adsorbent bed undergoing desorption for the purpose of desorbing the components adsorbed thereon. The thus-desorbed gas is passed to the absorption-separation unit to be treated. In order to use said portion of the circulating synthesis gas for this purpose, the outlet gas of the synthesis gas compressor is branched in a small amount. The heating of the gas is accomplished by steam or heat contained in the synthesis product gas from the synthesis reactor.

Figure 11:
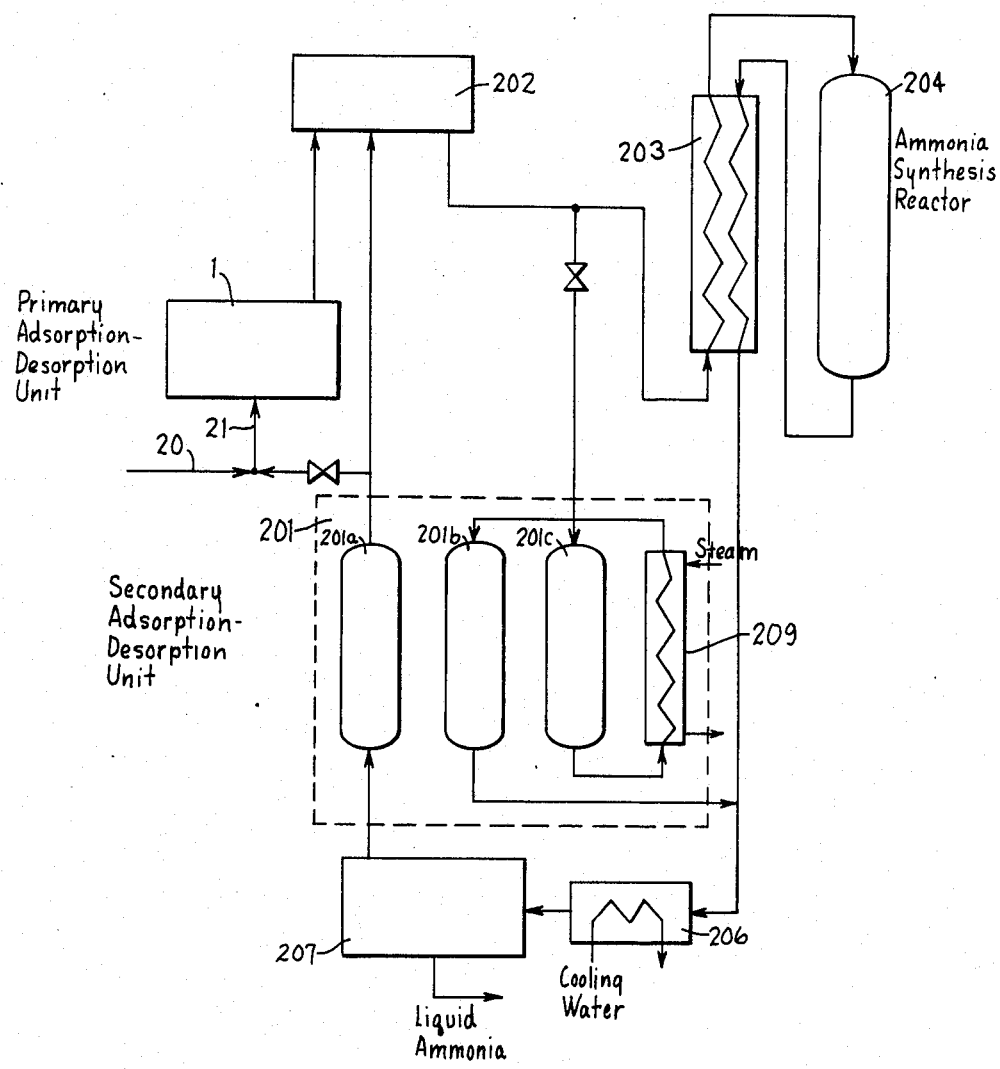
FIG. 11 is a schematic flow diagram of an apparatus for carrying out a process of the invention which incorporates a water adsorption-separation unit and a thermal swing adsorption-desorption unit.

FIG. 11 is a schematic diagram showing an ammonia synthesis unit incorporating the secondary adsorption-desorption unit in the synthesis loop. In the drawing, 201 represents the secondary adsorption-desorption unit, wherein each of 201a, 201b, and 201c denotes an adsorbent bed, and 209 denotes a heater. In FIG. 11, the bed 201a is undergoing the adsorption step, the bed 201b is undergoing the heating-desorption step, and the bed 201c is undergoing the cooling step.

A synthesis product gas flowing from an ammonia synthesis reactor 204 is cooled in series in a heat-exchanger 203 and a cooler 206 and then is fed to an ammonia absorption-separation unit 207 wherein almost all of the ammonia contained in the gas is separated by absorption in water. The synthesis gas discharged therefrom then enters the adsorption-desorption unit 201, each of the adsorbent beds 201a, 201b and 201c in the unit being packed with preferably type 3A zeolite which removes ammonia and water from the gas. Most of the synthesis gas that flows out of the unit 201a is directly drawn into a synthesis gas compressor 202 to be recirculated to the synthesis reactor 204, while the remainder, merged with a fresh feed gas that is supplied through line 20, is fed to the primary adsorption-desorption unit 1 which functions primarily to effect the removal of excess nitrogen and other non-ammonia-producing gases. The treated synthesis gas from the unit 1 is then drawn into the synthesis gas compressor 202.

A portion of the synthesis gas discharged from the synthesis gas compressor 202 is flowed through a branch pipe for the purposes of effecting the heating-desorption and cooling of the secondary adsorption-desorption unit 201. Specifically, a portion of the synthesis gas from compressor 202 is fed to the bed 201c so as to cool the bed 201c. The gas discharged from the bed 201c is then fed to the bed 201b after being heated in a heater 209, whereby the heated gas desorbs ammonia from bed 201b. The gas from the bed 201b is circulated to the ammonia absorption-separation unit 207 via the cooler 206.

In the above manner, ammonia, which would otherwise be treated in the succeeding primary adsorption-desorption unit 1, is removed and its associated recovery unit is no longer required. Further, by treating the portion of the circulating synthesis gas in the primary adsorption-desorption unit 1, the concentration of inert gas components in the circulating synthesis gas is reduced to an extremely low level.

In the present invention, the adsorption is carried out by replacement-adsorption in the primary adsorption-desorption unit. Therefore, there is a risk that the adsorption will not be satisfactorily effected when there is not enough of the adsorbent bed which has adsorbed the substance (nitrogen) that is to be replaced by other adsorbable components. This corresponds, for example, to the case wherein the excess amount of nitrogen is relatively small and, in the gas fed to the bed, the amount of ammonia that is to replace adsorbed nitrogen is relatively large. Since the adsorbable components are adsorbed on an adsorbent in accordance with the strength of their adsorption affinities to the adsorbent, there is a possibility of the leakage of carbon monoxide that is relatively weak in the adsorption affinity.

Accordingly, in this case, it is useful to take such a precaution as to treat carbon monoxide, in advance, by methanation or the like, or reducing the ammonia content in the circulating synthesis gas.

The process of the present invention accomplished: (i) separation of ammonia; (ii) separation of excess nitrogen; and (iii) separation of the non-ammonia-producing gaseous components, such as water, carbon dioxide, carbon monoxide, methane and argon, by effectively using an adsorption-desorption unit and is particularly suitable for low pressure ammonia synthesis.

The process of the third embodiment of the present invention specifically described above is further illustrated with reference to an example of a practical design.

FIG. 9 is a schematic diagram of an adsorption-desorption unit comprising five adsorbent beds for carrying out a process according to the third embodiment of the present invention.

Figure 10:
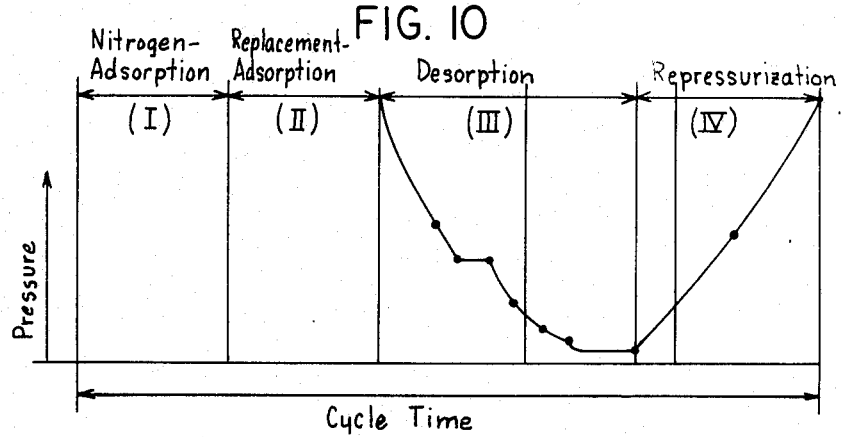
FIG. 10 is a diagram showing the cycle of steps for the adsorption-desorption unit shown in FIG. 9.

FIG. 10 is a diagram showing the cycle of steps for one bed of the adsorption-desorption unit shown in FIG. 9.

In this example, the desorption and replacement in the desorption step is carried out by means of the third procedure described earlier.

In FIGS. 9 and 10, the adsorbent bed 1a is undergoing the nitrogen-adsorption step (I); the bed 1b is undergoing the replacement-adsorption step (II); the bed 1c is undergoing the desorption step (III); the bed 1d is undergoing first the desorption step (III) and then the repressurization step (IV); and the bed 1e is undergoing the repressurization step (IV).

A fresh synthesis gas enters this unit through a conduit 21 and is introduced into the bed 1b. Components other than hydrogen and nitrogen are adsorbed onto the bed 1b by the replacement of nitrogen previously adsorbed on the bed 1b. A portion of the gas flowing from the bed 1b is passed through a bypass conduit 23 into the bed 1a, while the remainder is discharged through a hydrogen-nitrogen line 25. The nitrogen in the gas that flows through the bed 1a is removed almost completely through adsorption and then the gases discharged therefrom through a hydrogen line 24 to be merged with the gas flowing through the hydrogen-nitrogen line 25. The thus-merged gas constituted a product synthesis gas flowing through a conduit 22.

When the adsorbent bed 1c is switched so as to undergo the desorption step and thus is depressurized, the gas thereby evolved is discharged through first a depressurized gas line 227, then a bypass conduit 226 and then a depressurized gas receiving line 228, into the adsorbent bed 1e undergoing the repressurization step. When the pressures in the adsorbent beds 1c and 1e become equal to each other, then the gas evolved by the depressurization is received by an intermediate tank 213. Then, a replacing gas is fed to the bed 1c from a replacing gas tank 212, whereby a hydrogen-containing gas remaining in the voids of the bed is ultimately expelled. The thus-expelled gas is flowed into the intermediate tank 213 in the same manner.

The adsorbent bed 1c is then further depressurized and the gas thereby evolved is discharged through a desorbed gas discharge line 229. A portion of the thus-discharged gas is passed to a replacing gas receiving tank 210 through a replacing gas receiving line 230. The gas from the tank 210 is then pressurized in a replacing gas compressor 211, whereafter it is stored in a replacing gas tank 212 for use in the replacement operation.

Then, the gas evolved by the further depressurization-desorption of bed 1c is first fed to a buffer tank 214 having a heater therein. Thereafter, the resulting desorbed gas is reduced in pressure in an expander 217 and the pressure-reduced gas is discharged through a desorbed gas line 232. Sequentially, the gas evolved by the continuing desorption of bed 1c is reduced in pressure by a similar pressure reducing unit comprising another buffer tank 215 containing a heater therein and another expander 218. The gas evolved by further continuing desorption of bed 1c is directly discharged to a conduit 232 and then redirected via a vacuum tank 216 to a compressor 219 to be pressurized and discharged to the conduit 232. The compressor 219 is driven by the expanders 217 and 218. An electric motor is connected to the compressor 219 supplementarily and as a regulator.

Thus, the bed 1c is reduced in pressure ultimately down to vacuum, whereby almost all of the adsorbed gaseous components are desorbed, and then it is switched to undergo the subsequent repressurization step.

The adsorbent bed 1d is filled first with the gas from the intermediate tank 213 and then with the gas evolved from a bed, here, bed 1c, which is in the early stage of the desorption step. Then, a fresh synthesis gas passing through the conduit 21 is fed into the bed 1d, thus completing the filling operation of the bed 1d in the repressurization step.

The cycle of steps of one adsorbent bed is as illustrated in the diagram in FIG. 10. In the drawing, the ordinate represents pressure, while the abscissa denotes time.

Although a five-bed type adsorption-desorption unit has been described above, the adsorption-desorption unit used in the invention is, as a matter of fact, not limited to the five-bed type unit. To give an example, it is possible to use a four-bed type adsorption-desorption unit when strongly adsorbable components are present in small quantities in the gas to be treated and their desorption is relatively easy. However, it is difficult to employ a three-bed type unit because two adsorbent beds have to be subjected to adsorption at the same time.

Further, when strongly adsorbable components are present in high concentration in the feed gas, it might be necessary to provide enough time for their desorption. In this case, a six-bed type unit may be required. However, it is scarcely necessary to employ seven or more adsorbent beds in this adsorption-desorption unit. The five-bed type adsorption-desorption unit is most frequently used.

The preferred adsorbents to be used in this adsorption-desorption unit are activated carbon, zeolite, or a combination thereof.

Adsorbable components in the gas to be treated in the unit are categorized into strongly adsorbable components, such as water, ammonia, carbon dioxide and carbon monoxide and weakly adsorbable components such as nitrogen, methane and argon. No difficulties are encountered in the adsorption of water, ammonia, and carbon dioxide among the above strongly adsorbable components, because these components have large adsorption affinities for the adsorbent. However, careful attention should be paid to carbon monoxide which is inferior in adsorption affinity, in comparison to the foregoing three components, and causes interference with the ammonia synthesis when the amount of it that leaks into the ammonia synthesis loop is significant. Accordingly, in the selection of the adsorbent, preference should be given to an adsorbent which adsorbs carbon monoxide most efficiently.

On the other hand, the removal of methane and argon can be considered to be of secondary importance because these components will not cause fatal interference with ammonia synthesis, even if these components are not removed.

From the foregoing point of view, it is most preferable to pack the entirety of the adsorbent bed with zeolite or to pack activated carbon in the first layer and zeolite in the second layer of the adsorbent bed.

Activated carbon is particularly effective in the adsorption of carbon dioxide and methane. The reduction in methane content caused by this adsorption-desorption unit will decrease the methane content in the circulating synthesis gas to a negligible level, and also will make it possible to accept some leakage of methane from the steam reforming reaction steps, thereby making it possible further to mitigate the severity of the reaction conditions of the steam reforming reaction steps. Zeolite, on the other hand, is effective for the adsorption of nitrogen and carbon monoxide, and thus minimizes the leakage of carbon monoxide. It is particularly desirable to use zeolite which has a large separation coefficient between carbon monoxide and nitrogen, for example, CaX or the like.

As is obvious from the foregoing description, the process of the third embodiment of the present invention is most suitable as a treating process of an ammonia synthesis gas.

Finally, examples of material balances are shown below for the following three cases: that is, (1) a case wherein ammonia in the gas is reduced by one-half by a previous treatment; (2) a case wherein ammonia is not previously removed but carbon monoxide is removed by a previous methanation treatment; and (3) a case wherein ammonia is almost completely removed by previous water absorption.

The examples of material balance are obtained on the basis of the following conditions: adsorbable components are all adsorbed; the substitutions of nitrogen by the adsorbable components are carried out in the molar ratio of 1:1; loss of hydrogen and the like is disregarded; and the amounts in the balance are expressed in the unit of kg-mol.

EXAMPLE 1: With previous ammonia treatment

|  | Conduit (20) | Circulating gas | Conduit (21) | Components (A) | Conduit (23) | Conduit (25) | Conduit (22) |
|---|---|---|---|---|---|---|---|
| $H_2O$ | 0.1 | — | 0.1 | 0.1 | — | — | — |
| $NH_3$ | — | 18.9 | 18.9 | 18.9 | — | — | — |
| CO | 0.6 | — | 0.6 | 0.6 | — | — | — |
| $CH_4$ | 2.4 | — | 2.4 | 2.4 | — | — | — |
| Ar | 0.4 | — | 0.4 | 0.4 | — | — | — |
| $H_2$ | 65.8 | 268.6 | 334.4 | — | 73.1 | 261.3 | 334.4 |
| $N_2$ | 30.7 | 89.6 | 120.3 | 8.8 | 31.2 | 111.5 | 111.5 |

EXAMPLE 2: Without previous ammonia treatment but with previous methanation treatment

|  | Conduit (20) | Circulating gas | Conduit (21) | Components (A) | Conduit (23) | Conduit (25) | Conduit (22) |
|---|---|---|---|---|---|---|---|
| $H_2O$ | 0.1 | — | 0.1 | 0.1 | — | — | — |
| $NH_3$ | — | 39.8 | 39.8 | 39.8 | — | — | — |
| $CH_4$ | 3.1 | — | 3.1 | 3.1 | — | — | — |
| Ar | 0.4 | — | 0.4 | 0.4 | — | — | — |
| $H_2$ | 63.6 | 268.6 | 332.2 | — | 107.6 | 224.6 | 332.2 |
| $N_2$ | 30.7 | 89.6 | 120.3 | 9.5 | 52.9 | 110.8 | 110.8 |

EXAMPLE 3: With preceding water absorption

|  | Conduit (20) | Circulating gas | Conduit (21) | Conduit (23) | Conduit (25) | Conduit (22) |
|---|---|---|---|---|---|---|
| $H_2O$ | 0.1 | 0.4 | 0.5 | — | — | — |
| $NH_3$ | — | 0.8 | 0.8 | — | — | — |
| CO | 0.6 | — | 0.6 | — | — | — |
| $CH_4$ | 2.4 | — | 2.4 | — | — | — |
| Ar | 0.4 | — | 0.4 | — | — | — |
| $H_2$ | 65.8 | 268.6 | 334.4 | 36.1 | 288.3 | 334.4 |
| $N_2$ | 30.7 | 89.6 | 120.3 | 13.5 | 111.5 | 111.5 |

Note:
Numeral (21) and the like represent the numbers of the conduits shown in FIG. 1. Components (A) means the components removed by the adsorption.

Although a particular preferred embodiment of the invention has been disclosed in detail for illustrative purposes, it will be recognized that variations or modifications of the disclosed apparatus, including the rearrangement of parts, lie within the scope of the present invention.

The embodiment of the invention wherein an exclusive property or privileage is claimed are defined as follows:

1. In a process for refining an ammonia synthesis gas comprising the steps of:
   (a) subjecting a hydrocarbon raw material to a primary steam reforming reaction under pressure;
   (b) subjecting the resulting gas from the step (a) to a secondary steam reforming reaction by feeding air into said resulting gas;
   (c) subjecting carbon monoxide in the resulting gas from the step (b) to a catalytic carbon monoxide shift conversion reaction;
   (d) removing carbon oxides from the gas obtained by the step (c) to produce an ammonia synthesis gas containing nitrogen and hydrogen:
   (e) subjecting said ammonia synthesis gas to an ammonia synthesis reaction to produce ammonia and feeding the ammonia synthesis gas that contains produced ammonia to an ammonia separator unit to separate ammonia from the remaining ammonia synthesis gas; and
   (f) circulating said remaining ammonia synthesis gas separated from ammonia to the step (e), the improvement which comprises:
   (A) in step (b), feeding said air in excess of the amount of air equivalent to the nitrogen stoichiometrically required for the synthesis of ammonia;
   (B) in either step (d) or step (e), treating the ammonia synthesis gas in an adsorption-desorption unit to remove excess nitrogen as well as non-ammonia-producing gaseous components and, in the case of the synthesis gas of step (e), ammonia, from the ammonia synthesis gas, the amount of nitrogen that is removed being so regulated that the hydrogen-to-nitrogen ratio in the ammonia synthesis gas is the stoichiometric ratio required for the synthesis of ammonia and wherein the treatment in said adsorption-desorption unit comprises:
   (i) feeding said ammonia synthesis gas to a first adsorption bed which is saturated with adsorbed nitrogen, thereby causing said first bed to adsorb water vapor, carbon dioxide, carbon monoxide, methane and argon contained in said ammonia synthesis gas and to desorb the nitrogen previously adsorbed on said first bed while allowing gases of hydrogen and nitrogen to flow out of said first bed;
   (ii) feeding a portion of the gas flowing out of said first bed into a succeeding downstream second adsorption bed which has undergone desorption and repressurization steps, thereby to adsorb nitrogen contained in said portion of said gas fed therein and flowing substantially pure hydrogen from said second bed; and
   (iii) when said succeeding downstream second adsorption bed becomes saturated with adsorbed nitrogen, switching said first bed undergoing the step (i) to undergo a subsequent desorption step, switching said succeeding downstream second bed to simultaneously undergo the step (i), and simultaneously switching a further succeeding adsorbent bed which has undergone desorption and repressurization to undergo the step (ii), thereby cyclically continuing adsorption;
   (iv) combining the gas discharged from said further succeeding downstream bed undergoing the step (ii) with the portion of the gas which has been discharged from said first bed undergoing the step (i) but has not been sent to said further succeeding downstream bed undergoing the step (ii) whereby to form an ammonia synthesis gas, while controlling the flow rates of both said gases so that the hydrogen-to-nitrogen ratio in the ammonia synthesis gas can be adjusted to a predetermined value nearest to the stoichiometric ratio required for the synthesis of ammonia.

2. A process for refining an ammonia synthesis gas as claimed in claim 1, wherein the ammonia synthesis gas is treated in an adsorption-desorption unit within the step (d).

3. A process for refining an ammonia synthesis gas as claimed in claim 2 wherein said adsorption-desorption unit is a pressure swing adsorption-desorption unit which comprises from four to six adsorbent beds operated through a cycle of steps which comprises:
   (I) a nitrogen-adsorption step comprising, when a preceding bed is switched to undergo a replacement-adsorption step, feeding a portion of the gas discharged from said preceding bed to one of said adsorbent beds, said preceding bed being positioned upstream of said one bed;
   (II) a replacement-adsorption step comprising, when said one bed is saturated with nitrogen, feeding fresh ammonia synthesis gas to said one bed, a portion of the gas discharged from said one bed being fed to a succeeding adsorbent bed downstream from said one bed while the remainder is discharged directly to the outside of said unit;
   (III) a desorption step comprising, when said succeeding adsorbent bed undergoing the nitrogen-absorption step is saturated, relieving pressure in said one bed thereby sequentially desorbing adsorbed components therefrom;

(IV) a repressurization step comprising, when said one bed has completed the desorption step, repressurizing said one bed; and cyclically repeating said steps (I)–(IV) for said one bed.

4. A process for refining ammonia synthesis gas as claimed in claim 3 which further comprises: in said step (III), before said one bed undergoes pressure relief, feeding a gas containing almost no hydrogen into said one bed thereby replacing a gas present in the voids in said one bed; discharging the replaced gas from the adsorption-desorption unit; and then feeding the gas evolved from said one bed in the early stage of said pressure relief into an adsorbent bed undergoing the repressurization step.

5. A process for refining an ammonia synthesis gas as claimed in claim 3 which further comprises: in said step, (III) relieving pressure in said one bed to a medium pressure; then feeding a gas containing almost no hydrogen into said one bed thereby replacing a gas present in the voids in said one bed; discharging the gas evolved by said pressure relief and the replaced gas from the adsorption-desorption unit; further relieving pressure in said one bed; feeding the gas evolved from said one bed in the early stage of said further pressure relief into an adsorbent bed undergoing the repressurization step.

6. A process for refining an ammonia synthesis gas as claimed in claim 4 which further comprises: in said step (III), subsequent to the feeding of the evolved gas by pressure relief to a bed undergoing the repressurization step, feeding the gas evolved from said one bed by further pressure relief to a pressurizing apparatus at a medium pressure; and pressurizing said gas in said apparatus to a pressure higher than the replacing pressure thereby preparing the replacing gas to be used in the replacing operation.

7. A process for refining an ammonia synthesis gas as claimed in claim 3 which further comprises: feeding a portion of the hydrogen gas that flows out of a bed undergoing the nitrogen-adsorption step (I) into a vessel at a constant flow rate to store said portion of the gas in said vessel as a primary filling gas for use for the repressurization of said one bed in the step (IV); feeding said portion of hydrogen gas through said vessel to said one bed in the early stage of the repressurization; and then feeding said portion of hydrogen gas directly to said one bed via a hydrogen gas line with the inlet and outlet valves of said vessel being closed in the later stage of the repressurization.

8. A process for refining an ammonia synthesis gas as claimed in claim 3 which further comprises: feeding first a desorbing gas heated to a high temperature and then a desorbing gas cooled to a low temperature to said one bed, both of the said desorbing gases having been evolved by pressure relief from a bed undergoing the desorption step, at the position of the adsorption front of strongly adsorbable components adsorbed on said one bed during the adsorption step (II), in the final stage of the desorption step (III).

9. A process for refining an ammonia synthesis gas as claimed in claim 1 which further comprises: in the step (d) of claim 1, after carbon dioxide is removed from fresh ammonia synthesis gas by absorption at a temperature lower than 0° C., feeding said synthesis gas into said pressure swing adsorption-desorption unit, while keeping the temperature and pressure of said gas the same as in said absorption.

10. A process for refining an ammonia synthesis gas as claimed in claim 1 which further comprises: when the removal of ammonia is incomplete in the step (e), as the treatment in an adsorption-desorption unit within the step (e), feeding the synthesis gas sequentially first to an adsorption-desorption unit using type 3A zeolite as an adsorbent thereby primarily separating ammonia and water and then to a pressure swing adsorption unit using an adsorbent different than said type 3A zeolite thereby separating nitrogen and non-ammonia-producing gaseous components according to their relative tendencies to be adsorbed and the relative amount of the component gases thereof.

11. A process for refining an ammonia synthesis gas as claimed in claim 1 which further comprises: when the removal of ammonia is almost complete in the step (e), as the treatment in an adsorption-desorption unit within the step (e), feeding the synthesis gas to a pressure swing adsorption-desorption unit thereby separating nitrogen and non-ammonia-producing gaseous components according to their relative tendencies to be adsorbed and the relative amount of the component gases thereof.

12. A process for refining an ammonia synthesis gas as claimed in claim 1 which further comprises: before said synthesis gas is treated in the adsorption-desorption unit in step (e), feeding said synthesis gas into a liquefaction-separation unit utilizing cooling thereby separating ammonia from the synthesis gas so that not more than 3% of ammonia remains in said synthesis gas; combining the resulting synthesis gas discharged from the liquefaction-separation unit with a fresh synthesis gas obtained in the step (d); and feeding the combined synthesis gas to said adsorption-desorption unit.

13. A process for refining an ammonia synthesis gas as claimed in claim 1 which further comprises: before said synthesis gas is treated in the adsorption-desorption unit, in step (e) feeding said synthesis gas into a water absorption-separation unit thereby separating ammonia from the synthesis gas; combining the resulting synthesis gas discharged from the water absorption-separation unit with a fresh synthesis gas obtained in the step (d); and feeding the combined synthesis gas to said adsorption-desorption unit.

14. A process for refining an ammonia synthesis gas as claimed in claim 1 which further comprises: before said synthesis gas is treated in the adsorption-desorption unit, in step (e) feeding said synthesis gas into a water absorption-separation unit thereby separating ammonia from the synthesis gas; feeding the synthesis gas discharged from said water absorption-separation unit to another adsorption-desorption unit packed with adsorbent thereby removing water and ammonia; feeding a larger portion of the synthesis gas discharged from said another adsorption-desorption unit directly to the ammonia synthesis reactor; combining the remaining smaller portion of said synthesis gas with a fresh synthesis gas obtained in the step (d); and feeding the combined synthesis gas to the former adsorption-desorption unit.

15. A process tor refining an ammonia synthesis gas as claimed in claim 1 wherein said ammonia synthesis gas is treated in an adsorption-desorption unit within step (e) and wherein treatment in said adsorption-desorption unit comprises:

(i) feeding a synthesis gas comprising hydrogen, nitrogen, ammonia and non-ammonia-producing gaseous components to one adsorbent bed which has been saturated with nitrogen through adsorption, thereby allowing said one bed to adsorb all of water vapor, almost all of the carbon dioxide and carbon monoxide, most of the methane, and a considerable amount of argon contained therein by the replacement of the nitrogen previously adsorbed thereon, while allowing hydrogen and nitrogen to flow out of said one bed without being adsorbed;

(ii) feeding a portion of the gas flowed out of said one bed into a succeeding downstream adsorbent bed which has undergone desorption and repressurization steps, thereby separating almost all of the nitrogen contained in said portion of the gas through adsorption;

(iii) when said succeeding downstream adsorbent bed becomes saturated with nitrogen, switching said one bed undergoing the step (i) to undergo a subsequent desorption step, switching said succeeding downstream bed to simultaneously undergo the step (i), and simultaneously switching a further succeeding adsorbent bed which has undergone desorption and repressurization to undergo the step (ii), thereby cyclically continuing adsorption, (iv) combining the gas discharged from the said succeeding downstream bed undergoing the step (ii) with the gas which has been discharged from said one bed undergoing the step (i) but has not been sent to said succeeding downstream bed undergoing the step (ii), while controlling the flow rates of both gases so that the hydrogen-to-nitrogen ratio in the synthesis gas can be adjusted to a desired value close to the stoichiometric ratio required for the synthesis of ammonia.

16. A process for refining an ammonia synthesis gas as claimed in claim 15 wherein said adsorption-desorption unit is a pressure swing adsorption-desorption unit which comprises four, five or six adsorbent beds operated by a cycle of steps which comprises:

(I) a nitrogen-adsorption step comprising, when a preceding bed is switched to undergo a replacement-adsorption step, feeding a portion of the gas discharged from said preceding bed to one of said adsorbent beds, said preceding bed being positioned upstream of said one bed;

(II) a replacement-adsorption step comprising, when said one bed is saturated with nitrogen, feeding a fresh synthesis gas to said one bed, a portion of the gas discharged from said one bed being fed to a succeeding adsorbent bed downstream of said one bed while the remainder is discharged directly to the outside of said unit;

(III) a desorption step comprising, when said succeeding adsorbent bed undergoing the nitrogen-adsorption step is saturated, relieving pressure in said one bed thereby sequentially desorbing adsorbed components therefrom;

(IV) a repressurization step comprising, when said one bed has finished the desorption step, repressurizing said one bed; and cyclically repeating said steps (I)–(IV) for said one bed.

17. A process for refining an ammonia synthesis gas as claimed in claim 16 which further comprises: in the desorption step (III), using a pressure swing adsorption-desorption unit which effects desorption of said one bed by pressure relief and heating by a hot gas.

18. A process for refining an ammonia synthesis gas as claimed in claim 16 which further comprises: in said step (III), before said one bed undergoes pressure relief, feeding a gas containing almost no hydrogen into said one bed thereby replacing a gas present in the voids in said one bed; and feeding the replaced gas into an adsorbent bed undergoing the repressurization step or discharging the replaced gas from the adsorption-desorption unit.

19. A process for refining an ammonia synthesis gas as claimed in claim 16 which further comprises: in said step (III), relieving pressure in said one bed to a medium pressure; then feeding a gas containing almost no hydrogen into said one bed thereby replacing a gas present in the voids in said one bed; and feeding the gas evolved by said pressure relief and the replaced gas into an adsorbent bed undergoing the repressurization step or discharging said both gases from the adsorption-desorption unit.

20. A process for refining an ammonia synthesis gas as claimed in claim 16 which further comprises: in said step (III), relieving pressure in said one bed to a medium pressure; feeding the gas evolved by the pressure relief to an adsorbent bed undergoing the repressurization step; then further relieving pressure in said one bed; then feeding a gas containing almost no hydrogen into said one bed thereby replacing a gas present in the voids in said one bed; feeding the gas evolved by said further pressure relief and the replaced gas into an intermediate tank, thereby using the resulting gas as a filling gas for the repressurization step.

21. A process for refining an ammonia synthesis gas as claimed in claim 18 which further comprises: in said step (III), subsequent to the feeding of the evolved gas by pressure relief to a bed undergoing the repressurization step or to an intermediate tank, or the discharge of said gas from the adsorption-desorption unit, feeding the gas evolved from said one bed by further pressure relief to a pressurizing apparatus at a medium pressure; and pressurizing said gas in said apparatus to a pressure higher than the replacing pressure thereby preparing the gas to be used in the replacing operation.

22. A process for refining an ammonia synthesis gas as claimed in claim 18 which further comprises: in said step (III), in the desorption by pressure relief subsequent to the replacing operation, feeding a portion of the gas evolved by said pressure relief through one or more depressurization apparatuses each comprising a buffer tank and an expander in accordance with the degree of pressure relief thereby generating power which drives a compressor that draws a portion of said evolved gas at a pressure lower than the pressure of the gas discharged from the adsorption-desorption unit and pressurizes it to the pressure of the said discharged gas.

23. A process for refining an ammonia synthesis gas as claimed in claim 1 which further comprises: in the step (d), after carbon dioxide is removed from the synthesis gas by absorption at a temperature lower than 0° C., merging said synthesis gas, while keeping its temperature and pressure as in the absorption, with the circulating synthesis gas.

24. A process for refining an ammonia synthesis gas as claimed in claim 16 which further comprises: washing with water the gas evolved from said one bed undergoing desorption in the desorption step (III); distilling the resulting aqueous ammonia solution; and liquefying the distilled ammonia through cooling thereby obtaining liquid ammonia.

25. A process for refining an ammonia synthesis gas as claimed in claim 5 which further comprises: in said step (III), subsequent to the feeding of the evolved gas by pressure relief to a bed undergoing the repressurization step, feeding the gas evolved from said one bed by further pressure relief to a pressurizing apparatus at a medium pressure; and pressurizing said gas in said apparatus to a pressure higher than the replacing pressure thereby preparing the replacing gas to be used in the replacing operation.

26. A process for refining an ammonia synthesis gas as claimed in claim 19 which further comprises: in said step (III), subsequent to the feeding of the evolved gas by pressure relief to a bed undergoing the repressurization step or to an intermediate tank, or the discharge of said gas from the adsorption-desorption unit, feeding the gas evolved from said one bed by further pressure relief to a pressurizing apparatus at a medium pressure; and pressurizing said gas in said apparatus to a pressure higher than the replacing pressure thereby preparing the gas to be used in the replacing operation.

27. A process for refining an ammonia synthesis gas as claimed in claim 20 which further comprises: in said step (III), subsequent to the feeding of the evolved gas by pressure relief to a bed undergoing the repressurization step or to an intermediate tank, or the discharge of said gas from the adsorption-desorption unit, feeding the gas evolved from said one bed by further pressure relief to a pressurizing apparatus at a medium pressure; and pressurizing said gas in said apparatus to a pressure higher than the replacing pressure thereby preparing the gas to be used in the replacing operation.

28. A process for refining an ammonia synthesis gas as claimed in claim 19 which further comprises: in said step (III) the desorption by pressure relief subsequent to the replacing operation, feeding a portion of the gas evolved by said pressure relief through one or more depressurization apparatuses each comprising a buffer tank and an expander in accordance with the degree of pressure relief thereby generating power which drives a compressor that draws a portion of said evolved gas at a pressure lower than the pressure of the gas discharged from the adsorption-desorption unit and pressurizes it to the pressure of the said discharge gas.

29. A process for refining an ammonia synthesis gas as claimed in claim 20 which further comprises: in said step (III) the desorption by pressure relief subsequent to the replacing operation, feeding a portion of the gas evolved by said pressure relief through one or more depressurization apparatuses each comprising a buffer tank and an expander in accordance with the degree of pressure relief thereby generating power which drives a compressor that draws a portion of said evolved gas at a pressure lower than the pressure of the gas discharged from the adsorption-desorption unit and pressurizes it to the pressure of the said discharge gas.

* * * * *